US012793492B2

(12) United States Patent
Saito

(10) Patent No.: US 12,793,492 B2
(45) Date of Patent: Nov. 10, 2026

(54) AUTHENTICATION SYSTEM AND METHOD FOR ALLOWING ENTRY INTO MULTIPLE AREAS

(71) Applicant: NEC Corporation, Tokyo (JP)

(72) Inventor: Yasuji Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/283,687

(22) PCT Filed: Mar. 29, 2021

(86) PCT No.: PCT/JP2021/013249
§ 371 (c)(1),
(2) Date: Sep. 22, 2023

(87) PCT Pub. No.: WO2022/208598
PCT Pub. Date: Oct. 6, 2022

(65) Prior Publication Data

US 2024/0177553 A1 May 30, 2024

(51) Int. Cl.
*G07C 9/25* (2020.01)
*G07C 9/37* (2020.01)

(52) U.S. Cl.
CPC ............... *G07C 9/253* (2020.01); *G07C 9/37* (2020.01)

(58) Field of Classification Search
CPC ...... G07C 9/00563; G07C 9/25; G07C 9/253; G07C 9/26; G07C 9/37; G07C 9/20; G07C 9/27; G07C 9/29
USPC .............. 235/382; 340/5.52, 5.53, 5.82, 5.83
See application file for complete search history.

(56) References Cited

U.S. PATENT DOCUMENTS

2020/0357209 A1 11/2020 Kochi et al.
2023/0316838 A1* 10/2023 Yamaoka ................ G07C 9/25 705/13

FOREIGN PATENT DOCUMENTS

JP 2007-280083 A 10/2007
JP 2008-027432 A 2/2008
JP 2011-184991 A 9/2011
JP 2019-125001 A 7/2019

OTHER PUBLICATIONS

International Search Report for PCT Application No. PCT/JP2021/013249, mailed on May 25, 2021.

* cited by examiner

*Primary Examiner* — Suezu Ellis
(74) *Attorney, Agent, or Firm* — Sughrue Mion, PLLC

(57) ABSTRACT

The present invention provides an authentication system (10) provided with a first area, and a second area being able to enter after passing the first area, and configured to determine entrance to the second area, and the authentication system (10) determines authentication information being used when a user enters the first area, and determines authentication information necessary for the user to enter the second area according to the determined authentication information.

8 Claims, 22 Drawing Sheets

FIG. 7

USER LIST

| AUTHENTICATION INFORMATION (REFERENCE DATA) | | | |
|---|---|---|---|
| USER IDENTIFICATION INFORMATION | CARD IDENTIFICATION INFORMATION | FACE INFORMATION | .... |
| U317289 | C13C11 | * * * | .... |
| P101181 | C72M77 | * * * | .... |
| ⋮ | ⋮ | ⋮ | ⋮ |

FIG. 8

| USER IDENTIFICATION INFORMATION | AUTHENTICATION POINT A (FACILITY ENTRANCE) | AUTHENTICATION POINT B (SECURITY ROOM ENTRANCE) | AUTHENTICATION POINT C (SERVER ROOM ENTRANCE) | .... | VIA-INTERNET SECOND AUTHENTICATION PROCESSING |
|---|---|---|---|---|---|
| U317289 | AUTHENTICATION INFORMATION OF FIRST TYPE | — | — | .... | NOT DONE |
| P101181 | AUTHENTICATION INFORMATION OF SECOND TYPE | — | — | .... | NOT DONE |
| P778721 | AUTHENTICATION INFORMATION OF FIRST TYPE | — | AUTHENTICATION INFORMATION OF SECOND TYPE | .... | NOT DONE |
| U007188 | AUTHENTICATION INFORMATION OF FIRST TYPE | — | AUTHENTICATION INFORMATION OF FIRST TYPE | .... | DONE |
| .... | .... | .... | .... | .... | .... |

FIG. 11

| USER NAME | AUTHENTICATION POINT A (ANOTHER AUTHENTICATION POINT) | AUTHENTICATION POINT B (FIRST AUTHENTICATION POINT) | VIA-INTERNET FACE AUTHENTICATION | RESULT |
|---|---|---|---|---|
| MR./MS. A | FACE AUTHENTICATION (MR./MS. A) | IC CARD OR THE LIKE (MR./MS. A) | NOT DONE | PASSED AUTHENTICATION POINT B |
| MR./MS. B | IC CARD OR THE LIKE (MR./MS. B) | IC CARD OR THE LIKE (MR./MS. B) | DONE | PASSED AUTHENTICATION POINT B |
| MR./MS. C | IC CARD OR THE LIKE (MR./MS. C) | IC CARD OR THE LIKE (MR./MS. C) | NOT DONE | ERROR |
| MR./MS. D | IC CARD OR THE LIKE (MR./MS. A) | IC CARD OR THE LIKE (MR./MS. A) | NOT DONE | ERROR |
| MR./MS. E | FACE AUTHENTICATION (MR./MS. A) | IC CARD OR THE LIKE (MR./MS. E) | NOT DONE | ERROR |

AUTHENTICATION SYSTEM AND METHOD FOR ALLOWING ENTRY INTO MULTIPLE AREAS

This application is a National Stage Entry of PCT/JP2021/013249 filed on Mar. 29, 2021, the contents of all of which are incorporated herein by reference, in their entirety.

TECHNICAL FIELD

The present invention relates to an authentication system and an authentication method.

BACKGROUND ART

Patent Documents 1 and 2 disclose a system for managing entrance to a management area.

In a system disclosed in Patent Document 1, an integrated circuit (IC) card reader is installed in an entrance of a building. Then, the system performs authentication processing based on a person identifier (ID) read by the IC card reader, and performs entrance management at the position, based on a result of the authentication. Further, in the system, an IC card reader and a camera are installed in an entrance of an area being present within a building. The system first performs face authentication based on an image generated by the camera, and in a case where face authentication has failed, the system performs authentication processing based on the above-described person ID. Then, the system performs entrance management at the position, based on these authentication results.

A system disclosed in Patent Document 2 switches a detection mode in response to detection of unauthorized entry/exit. In a mode at a time when unauthorized entry/exit is not detected, only authentication based on data stored in an IC chip is performed. Then, in a mode at a time when unauthorized entry/exit is detected, both of authentication based on data stored in the IC chip, and face authentication are performed. The face authentication is performed by utilizing a mobile terminal of a user. Specifically, a user activates a predetermined application of his/her mobile terminal, and photographs his/her face. In response to this, the application performs face authentication. Subsequently, the user brings his/her mobile terminal close to an antenna for contactless communication of the system, and causes the mobile terminal to perform short-range wireless communication. In response to this, a result of the above-described face authentication is transmitted from the mobile terminal to the system. In this way, the system acquires a result of face authentication.

RELATED DOCUMENT

Patent Document

Patent Document 1: Japanese Patent Application Publication No. 2007-280083

Patent Document 2: Japanese Patent Application Publication No. 2011-184991

DISCLOSURE OF THE INVENTION

Technical Problem

There is a case that a plurality of authentication points are provided within a facility, authentication processing is performed at each authentication point, and entrance beyond the point is managed. For example, an example or the like in which an authentication point is provided in an entrance of a facility, and an authentication point is further provided in an entrance of each of a plurality of areas being present within the facility is conceived. In this way, in a system for performing multistage authentication within one facility, maintaining a high level of security without waste has been desired.

A challenge of the present invention is to achieve a technique for maintaining a high level of security without waste in a system for performing multistage authentication.

Solution to Problem

The present invention provides an authentication system to determine whether to allow entry into a second area, the second area being able to enter after passing a first area, the authentication system including, a determination unit that determines authentication information being used when a user enters the first area, and determines authentication information necessary for the user to enter the second area according to the determined authentication information.

Further, the present invention provides an authentication method including, by an authentication system to determine whether to allow entry into a second area, the second area being able to enter after passing a first area, determining authentication information being used when a user enters the first area, and determining authentication information necessary for the user to enter the second area according to the determined authentication information.

Advantageous Effects of Invention

The present invention achieves a technique for maintaining a high level of security without waste in a system for performing multistage authentication.

BRIEF DESCRIPTION OF THE DRAWINGS

FIG. 7 It is a diagram schematically illustrating one example of information to be processed by the authentication system according to the present example embodiment.

FIG. 8 It is a diagram schematically illustrating one example of information to be processed by the authentication system according to the present example embodiment.

FIG. 11 It is a diagram illustrating an advantageous effect of the authentication system according to the present example embodiment.

DESCRIPTION OF EMBODIMENTS

Hereinafter, example embodiments according to the present invention are described by using the drawings. Note that, in all drawings, a similar constituent element is indicated by a similar reference sign, and description thereof is omitted as necessary.

First Example Embodiment

Overview

Figure 1:
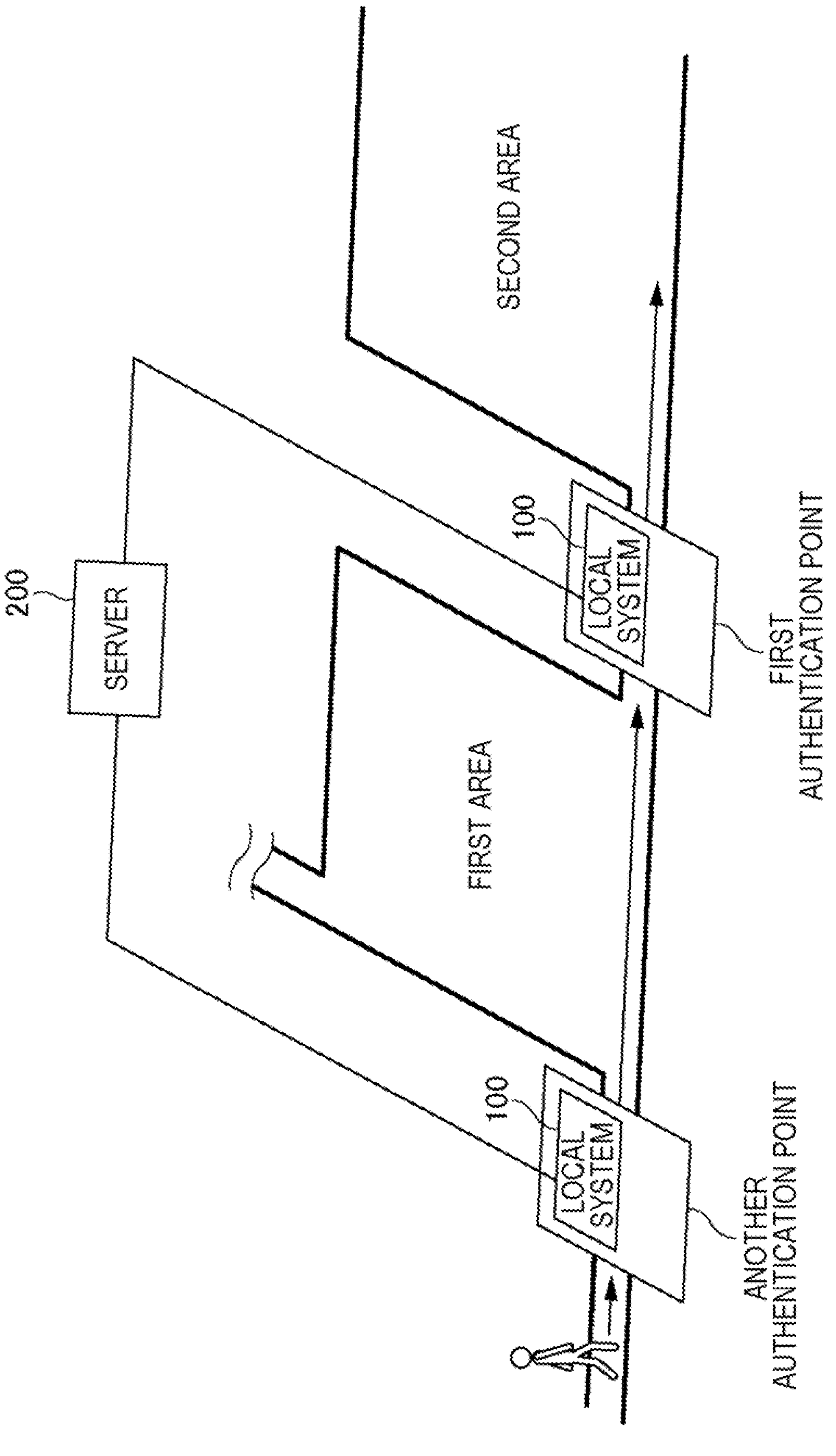
FIG. 1 It is a diagram illustrating an overall image of an authentication system according to a present example embodiment.

An overview of an authentication system according to a present example embodiment is described by using FIG. 1. Note that, an object of description of the overview is to recognize an overall image of the authentication system according to the present example embodiment. Detailed description of the authentication system according to the present example embodiment is described later.

The authentication system according to the present example embodiment includes a server 200, and a plurality of local systems 100. The server 200 and each of the plurality of local systems 100 are connected to be mutually communicable by wired and/or wireless communication.

In the present example embodiment, a plurality of authentication points are installed within a facility, and the local system 100 is installed at each of the plurality of authentication points. For example, an example or the like in which an authentication point is provided in an entrance of each of a plurality of areas within a facility is conceived, but the present example embodiment is not limited thereto. Examples of the facility are, for example, a building, a company, an amusement facility, an airport, a station, a housing complex (such as a large apartment and an apartment), a school, and the like, but the present example embodiment is not limited thereto. In FIG. 1, a first area, and a second area being able to enter after passing the first area are illustrated, and an authentication point is installed in an entrance of each area. Note that, in FIG. 1, the first area and the second area are separated, but a relationship that the first area includes the second area may be made.

Figure 2:
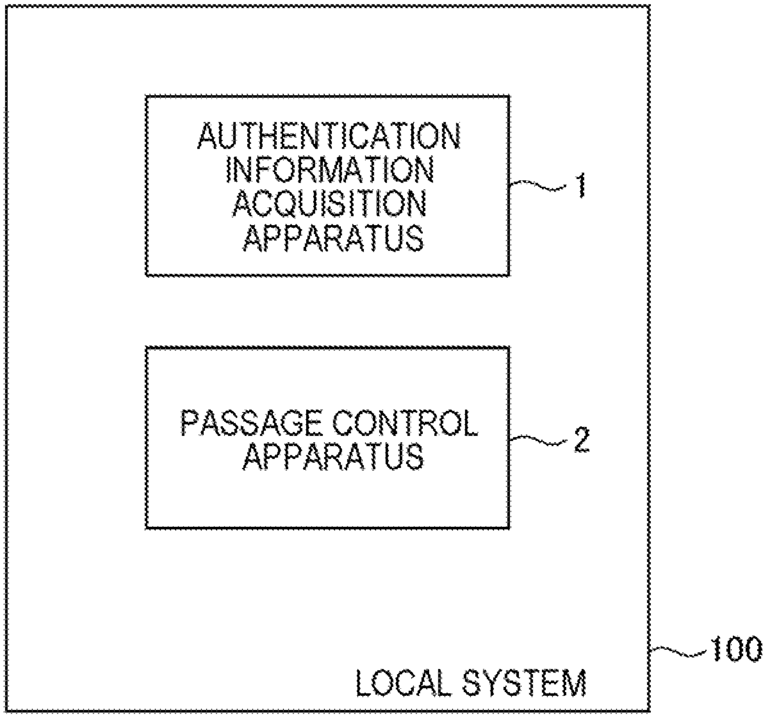
FIG. 2 It is one example of a functional block diagram of a local system according to the present example embodiment.

As illustrated in FIG. 2, the local system 100 includes an authentication information acquisition apparatus 1, and a passage control apparatus 2.

The authentication information acquisition apparatus 1 is an apparatus for acquiring, from a user, authentication information for performing authentication processing. Examples of the authentication information are user identification information, biological information, and the like. The user identification information is information in which a number, a character, a symbol, and the like are arranged, and is artificially generated information. The biological information is information being provided in each user and being unique to each user, and examples of the biological information are, for example, face information, iris information, fingerprint information, voiceprint information, gait information, and the like. A configuration of the authentication information acquisition apparatus 1 to be installed at each of a plurality of authentication points may be different from one another. For example, the number of types of pieces of acquirable authentication information may differ, or a type of acquirable authentication information may differ. For example, an example or the like in which the authentication information acquisition apparatus 1 installed at another authentication point in FIG. 1 is configured to be able to acquire user identification information and face information, and the authentication information acquisition apparatus 1 installed at a first authentication point is configured to be able to acquire user identification information is conceived, but the present example embodiment is not limited thereto.

At an authentication point where the authentication information acquisition apparatus 1 configured to be able to acquire pieces of authentication information of a plurality of types is installed, a user inputs, to the authentication information acquisition apparatus 1, one piece of authentication information selected from among the pieces of authentication information of a plurality of types. Then, the authentication system performs authentication processing, based on the input one piece of authentication information. On the other hand, at an authentication point where the authentication information acquisition apparatus 1 configured to be able to acquire only one type of authentication information is installed, a user inputs the authentication information to the authentication information acquisition apparatus 1. Then, the authentication system performs authentication processing, based on the input authentication information.

The passage control apparatus 2 includes a passage control mechanism (such as a gate or a door) for controlling passage of a person, and an apparatus for controlling an operation (such as opening and closing) of the passage control mechanism by an electrical signal. The passage control apparatus 2 controls an operation of the above-described passage control mechanism, based on a control signal from an authentication apparatus 3 to be described later.

Figure 3:
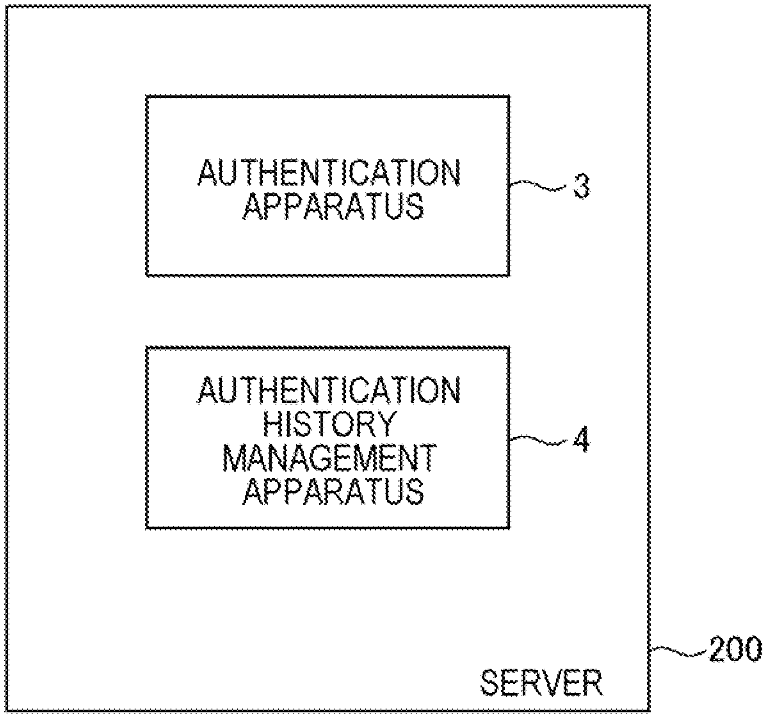
FIG. 3 It is one example of a functional block diagram of a server according to the present example embodiment.

As illustrated in FIG. 3, the server 200 includes the authentication apparatus 3, and an authentication history management apparatus 4.

The authentication history management apparatus 4 manages an authentication history of each user. Specifically, the authentication history management apparatus 4 manages, as an authentication history, a type of authentication information used in authentication processing that has been performed at each of authentication points where each user has passed in a past period (such as that day, or during a predetermined duration of time in a past).

The authentication apparatus 3 performs authentication processing of a user, based on authentication information acquired by the authentication information acquisition apparatus 1, and reference information stored in advance in the server 200. Then, the authentication apparatus 3 determines whether a user is allowed to pass an authentication point, based on a result of authentication processing, for each user.

By the way, in the present example embodiment, at least one of a plurality of authentication points is handled as the first authentication point. The first authentication point is, for example, installed in an entrance of an area being able to enter after passing another area.

The authentication information acquisition apparatus 1 installed at the first authentication point can acquire authentication information of a first type, but cannot acquire authentication information of a second type. The authentication information of the first type is, for example, user identification information, and the authentication information of the second type is, for example, biological information.

Then, a condition for passing the first authentication point is "authentication processing using authentication information acquired by the authentication information acquisition apparatus 1 installed at the first authentication point is successful", and "second authentication processing using authentication information of the second type (e.g., biological information) is successful".

As described above, the authentication information acquisition apparatus 1 installed at the first authentication point cannot acquire authentication information of the second type (e.g., biological information). Therefore, the condition that "second authentication processing using authentication information of the second type is successful" among the above-described condition is needed to be achieved, for example, by second authentication processing that has been performed at another authentication point in a past period. In other words, for example, in a case where the second authentication processing using authentication information of the second type is successful at another authentication point before coming to the first authentication point, the condition that "second authentication processing using authentication information of the second type is successful" among the above-described condition is satisfied.

Taking the above-described condition into account, the authentication apparatus 3 determines authentication information necessary for passing the first authentication point, based on authentication history information, for each user. Then, the authentication apparatus 3 determines whether to pass each user by using a specific result.

For a user in which information that the second authentication processing using authentication information of the second type is successful is not registered in authentication history information, the authentication apparatus 3 determines, as authentication information necessary for passing the first authentication point, "authentication information acquirable by the authentication information acquisition apparatus 1 installed at the first authentication point", and "authentication information of the second type". In a case where information that authentication processing using pieces of authentication information of these two types is successful is confirmed, the authentication apparatus 3 allows the user to pass the first authentication point.

On the other hand, for a user in which information that the second authentication processing using authentication information of the second type is successful is registered in authentication history information, the authentication apparatus 3 determines, as authentication information necessary for passing the first authentication point, "authentication information acquirable by the authentication information acquisition apparatus 1 installed at the first authentication point". In a case where information that authentication processing using the authentication information is successful is confirmed, the authentication apparatus 3 allows the user to pass the first authentication point.

By the way, a user in which information that the second authentication processing using authentication information of the second type is successful is not registered in authentication history information needs authentication information of the second type in order to pass the first authentication point. However, as described above, the authentication information acquisition apparatus 1 installed at the first authentication point cannot acquire authentication information of the second type (e.g., biological information).

Figure 4:
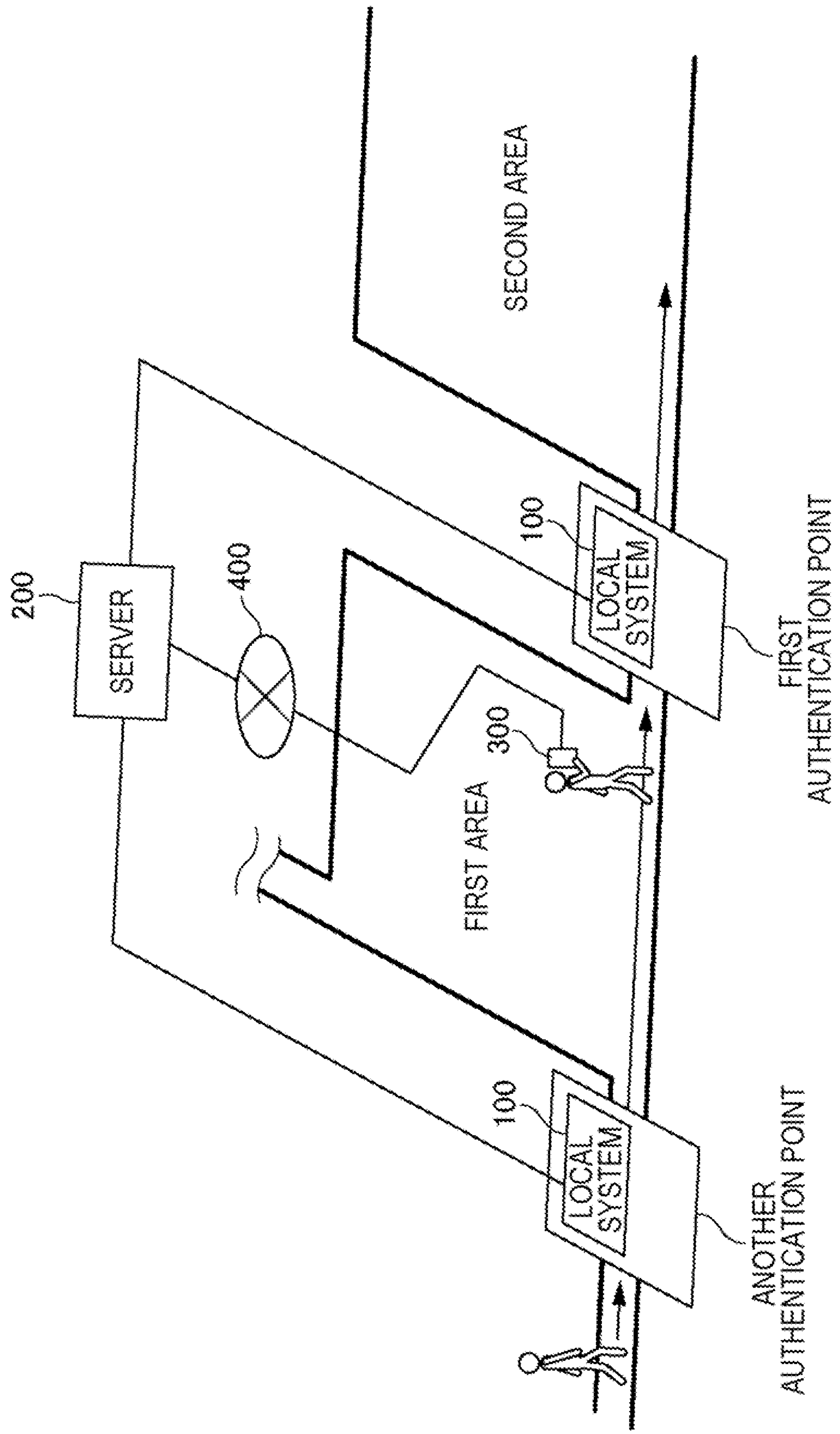
FIG. 4 It is a diagram illustrating an overall image of the authentication system according to the present example embodiment.

In view of the above, the authentication system according to the present example embodiment includes a function of acquiring authentication information of the second type via a user terminal owned by a user. As illustrated in FIG. 4, a user in which information that the second authentication processing using authentication information of the second type is successful is not registered in authentication history information can connect the server 200 and his/her user terminal 300 with each other via a communication network 400, and transmit the authentication information of the second type to the server 200. Then, the server 200 performs authentication processing, based on the authentication information of the second type received from the user terminal 300. This function allows a user to avoid troublesome work that the user goes to another authentication point and performs authentication processing to pass the first authentication point.

"Hardware Configuration"

Next, a configuration of the authentication system according to the present example embodiment is described in detail. First, one example of a hardware configuration of the authentication system is described. Each functional unit of the authentication system is achieved by any combination of hardware and software, mainly including a central processing unit (CPU) of any computer, a memory, a program loaded in a memory, a storage unit (capable of storing, in addition to a program stored in advance at a shipping stage of an apparatus, a program downloaded from a storage medium such as a compact disc (CD), a server on the Internet, and the like) such as a hard disk storing the program, and an interface for network connection. Then, it is understood by a person skilled in the art that there are various modification examples as a method and an apparatus for achieving the configuration.

Figure 5:
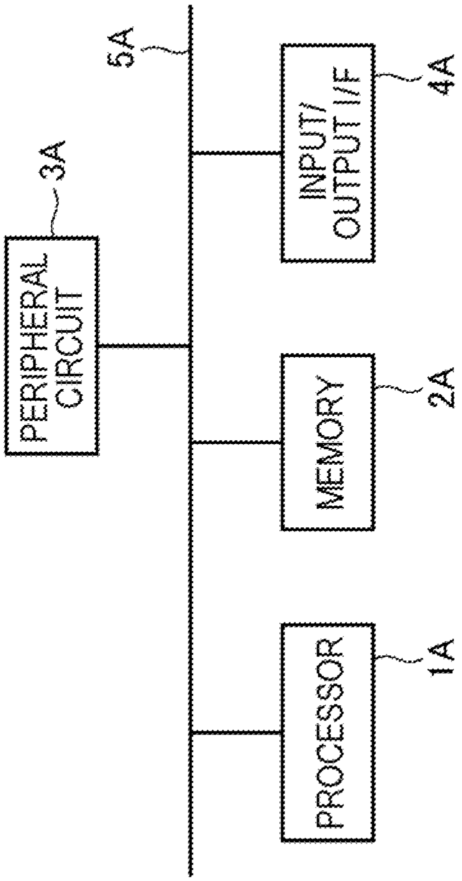
FIG. 5 It is a diagram illustrating one example of a hardware configuration of the authentication system according to the present example embodiment.

FIG. 5 is a block diagram illustrating a hardware configuration of the authentication system. As illustrated in FIG. 5, the authentication system includes a processor 1A, a memory 2A, an input/output interface 3A, a peripheral circuit 4A, and a bus 5A. The peripheral circuit 4A includes various modules. The authentication system may not include the peripheral circuit 4A. Note that, the authentication system may be constituted of a plurality of apparatuses that are physically and/or logically separated. In this case, each of the plurality of apparatuses can include the above-described hardware configuration.

The bus 5A is a data transmission path along which the processor 1A, the memory 2A, the peripheral circuit 4A, and the input/output interface 3A mutually transmit and receive data. The processor 1A is, for example, an arithmetic processing apparatus such as a CPU and a graphics processing unit (GPU). The memory 2A is, for example, a memory such as a random access memory (RAM) and a read only memory (ROM). The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can issue a command to each module, and perform an arithmetic operation, based on an arithmetic operation result of each module.

"Functional Configuration"

Figure 6:
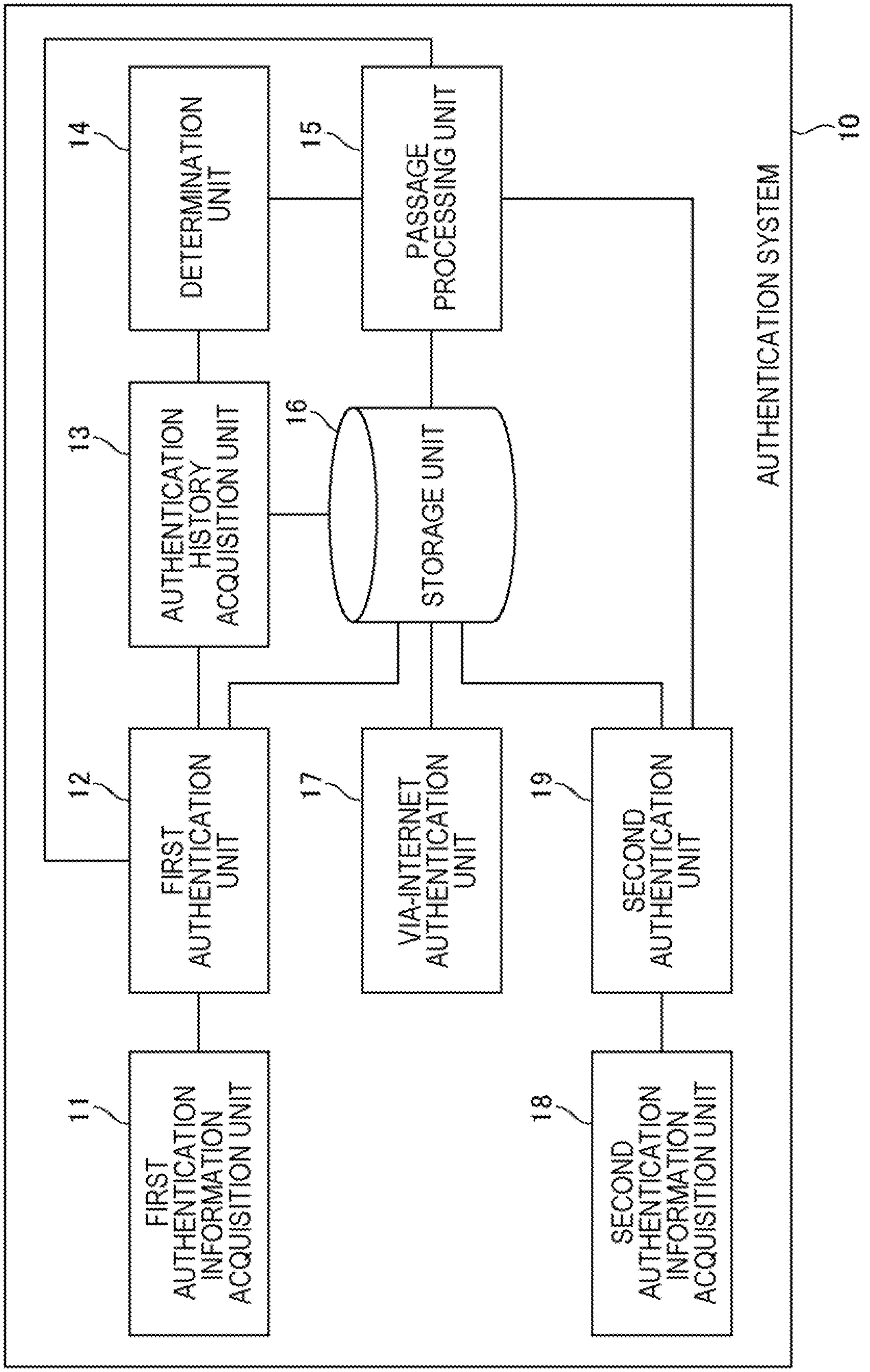
FIG. 6 It is one example of a functional block diagram of the authentication system according to the present example embodiment.

Next, a functional configuration of an authentication system 10 is described. FIG. 6 illustrates one example of a functional block diagram of the authentication system 10. As illustrated in FIG. 6, the authentication system 10 includes an authentication information acquisition unit (a first authentication information acquisition unit 11 and a second authentication information acquisition unit 18), an authentication unit (a first authentication unit 12 and a second authentication unit 19), an authentication history acquisition unit 13, a determination unit 14, a passage processing unit 15, a storage unit 16, and a via-internet authentication unit 17.

These function units are included in the server 200 and the local system 100 illustrated in FIGS. 1 and 4. There are various variations as to which function unit is included in the server 200 and the local system 100, and a configuration thereof is not limited.

For example, in a case where the server 200 and the local system 100 include apparatuses as illustrated in FIGS. 2 and 3, the server 200 includes the first authentication unit 12, the authentication history acquisition unit 13, the determination unit 14, the passage processing unit 15, the storage unit 16, the via-internet authentication unit 17, and the second authentication unit 19. Then, the local system 100 installed at the first authentication point includes the first authentication information acquisition unit 11 and the passage processing unit 15. Then, the local system 100 installed at another authentication point includes at least one of the first authentication information acquisition unit 11 and the second authentication information acquisition unit 18, and the passage processing unit 15.

First, a configuration of each function unit is described in detail. Thereafter, a flow of processing is described, while presuming an actual usage scene.

The storage unit 16 stores authentication information (reference data) to be utilized by authentication processing at an authentication point. At a time of authentication processing, collation between authentication information acquired from a user, and authentication information (reference data) stored in the storage unit 16 is performed. As described above, the authentication system 10 is configured to be able to perform authentication processing using pieces of authentication information of a plurality of types. Therefore, the storage unit 16 stores pieces of authentication information (reference data) of a plurality of types.

FIG. 7 schematically illustrates one example of authentication information (reference data) to be stored in the storage unit 16. In the illustrated example, user identification information, card identification information, and face information are associated with one another.

The user identification information is information in which a number, a character, a symbol, and the like are arranged, and is artificially generated information. For example, information, such as an employee identifier (ID), a membership ID, and a student number, for mutually identifying users utilizing a facility, becomes the user identification information. The card identification information is identification information being unique to a storage medium storing the user identification information. Note that, it is called "card" identification information, but a storage medium storing the user identification information is not limited to an IC card, and may be another apparatus, such as an IC tag, a smartphone, a smartwatch, and a mobile phone, being utilizable as a replacement of the IC card.

The face information is information (an image or a feature value) indicating a feature of an external appearance of a face. Another piece of biological information such as iris information, fingerprint information, voiceprint information, or gait information may be utilized as authentication information (reference data), in place of or in addition to the face information.

Note that, one example of processing of registering authentication information (reference data) as described above in the authentication system 10 by each user is described in a third example embodiment.

The second authentication information acquisition unit 18 acquires authentication information of the second type. The authentication information of the second type is biological information, such as, for example, face information, iris information, fingerprint information, voiceprint information, or gait information. The second authentication information acquisition unit 18 is configured to be able to acquire these pieces of biological information. For example, the second authentication information acquisition unit 18 is configured by including a camera, a fingerprint sensor, a microphone, and the like.

The authentication information acquisition apparatus 1 installed at any authentication point among a plurality of authentication points includes the second authentication information acquisition unit 18. Note that, the authentication information acquisition apparatus 1 installed at the first authentication point does not include the second authentication information acquisition unit 18. The second authentication information acquisition unit 18 inputs acquired authentication information of the second type to the second authentication unit 19. Information indicating at which any of the plurality of authentication points, information has been acquired may be included in information to be input to the second authentication unit 19.

The second authentication unit 19 performs the second authentication processing, based on authentication information of the second type that has been acquired by the second authentication information acquisition unit 18. Specifically, the second authentication unit 19 collates between authentication information of the second type that has been acquired by the second authentication information acquisition unit 18, and authentication information (reference data) of the second type stored in the storage unit 16. Then, in a case where a piece of reference data matching with (a degree of similarity being equal to or more than a threshold value) authentication information of the second type that has been acquired by the second authentication information acquisition unit 18 is present, the second authentication unit 19 determines that authentication is successful. On the other hand, in a case where a piece of reference data matching with authentication information of the second type that has been acquired by the second authentication information acquisition unit 18 is not present, the second authentication unit 19 determines that authentication has failed. The authentication result is input to the passage processing unit 15.

Further, in a case where authentication is successful, the second authentication unit 19 registers the information in authentication history information. The authentication history information indicates a content of authentication processing that has been performed at an authentication point where a user has passed in a past period. Hereinafter, it is assumed that authentication history information indicates a type of authentication information (such as face information or user identification information) used in authentication processing that has been performed at each authentication point. However, the authentication history information may indicate another content such as a type of authentication processing (such as face authentication processing, or authentication processing using user identification information) that has been performed at each authentication point. Examples of the past period are “that day”, “a predetermined duration of time in a past”, and the like, but the present example embodiment is not limited thereto.

The storage unit 16 stores authentication history information. FIG. 8 schematically illustrates one example of authentication history information. The illustrated authentication history information is associated with user identification information, and a type of authentication information used in authentication processing that has been performed at each of points where authentication is successful is registered. It can also be said that “authentication information used in authentication processing” is “authentication information that has been referred to in authentication processing”. The authentication history information indicates that authentication processing based on which type of authentication information has been performed at each point. For example, an illustrated authentication point B becomes the first authentication point. In the illustrated example, a user identified by user identification information P778721 is registered to a fact that authentication is successful at an authentication points A and C. then, information that authentication processing using authentication information of the first type has been performed at the authentication point A, and authentication processing using authentication information of the second type has been performed at the authentication point C is registered.

The first authentication information acquisition unit 11 acquires authentication information of the first type. The authentication information of the first type is, for example, user identification information. As described above, the user identification information is information in which a number, a character, a symbol, and the like are arranged, and is artificially generated information. The first authentication information acquisition unit 11 is configured to be able to acquire user identification information as described above. For example, the first authentication information acquisition unit 11 is configured to include a communication apparatus (such as a reader) for acquiring user identification information by performing short-range wireless communication with a storage medium (such as an IC card, an IC tag, a smartphone, a smartwatch, or a mobile phone) storing the user identification information, an apparatus (such as a touch panel, a physical button, a keyboard, or a mouse) for accepting manual input, a microphone for accepting voice input, a camera for accepting image input (recognizing user identification information within an image by a character analysis), and the like. Note that, as short-range wireless communication when acquiring user identification information, it is possible to use NFC, Bluetooth (registered trademark), Wi-Fi, next-generation ultra wide band (UWB), and the like.

The authentication information acquisition apparatus 1 installed at any authentication point among a plurality of authentication points includes the first authentication information acquisition unit 11. Note that, the authentication information acquisition apparatus 1 installed at the first authentication point includes the first authentication information acquisition unit 11. The first authentication information acquisition unit 11 inputs acquired authentication information of the first type to the first authentication unit 12. Information indicating at which any of the plurality of authentication points, information has been acquired may be included in information to be input to the first authentication unit 12.

The first authentication unit 12 performs first authentication processing, based on authentication information of the first type that has been acquired by the first authentication information acquisition unit 11. Specifically, the first authentication unit 12 collates between authentication information of the first type that has been acquired by the first authentication information acquisition unit 11, and authentication information (reference data) of the first type stored in the storage unit 16. Then, in a case where a piece of reference data matching (coincident) with the authentication information of the first type that has been acquired by the first authentication information acquisition unit 11 is present, the first authentication unit 12 determines that authentication is successful. On the other hand, in a case where a piece of reference data matching with the authentication information of the first type that has been acquired by the first authentication information acquisition unit 11 is not present, the first authentication unit 12 determines that authentication has failed. The authentication result is input to the passage processing unit 15.

Further, in a case where authentication is successful, the first authentication unit 12 registers the information in authentication history information. The storage unit 16 stores the authentication history information.

The via-internet authentication unit 17 acquires authentication information of the second type from a user terminal 300 via the communication network 400 such as the Internet. For example, a user inputs, to the user terminal 300, authentication information of the second type via an authentication information acquisition means of the second type (such as a camera, a fingerprint sensor, or a microphone) included in the user terminal 300. Then, the user performs a predetermined operation with respect to the user terminal 300, and transmits, to the authentication system 10, the authentication information of the second type that has been input to the user terminal 300. A transmission means of the authentication information of the second type from the user terminal 300 to the authentication system 10 is not specifically limited. For example, data may be uploaded from the user terminal 300 to the authentication system 10 via a predetermined application, or may be transmitted by an electronic mail, or another means may be adopted.

Then, the via-internet authentication unit 17 performs the second authentication processing, based on acquired authentication information of the second type. Specifically, the via-internet authentication unit 17 collates between acquired authentication information of the second type, and authentication information (reference data) of the second type stored in the storage unit 16. Then, in a case where a piece of reference data matching with (a degree of similarity being equal to or more than a threshold value) the acquired authentication information of the second type is present, the via-internet authentication unit 17 determines that authentication is successful. On the other hand, in a case where a piece of reference data matching with the acquired authentication information of the second type is not present, the via-internet authentication unit 17 determines that authentication has failed.

Then, in a case where the second authentication processing is successful, the via-internet authentication unit 17 registers the information in authentication history information. The storage unit 16 stores the authentication history information. FIG. 8 schematically illustrates one example of the authentication history information. An illustrated column "via-internet second authentication processing" is input by the via-internet authentication unit 17. A value "done" is associated with a user in which the second authentication processing by the via-internet authentication unit 17 is successful, and a value "not done" is associated with a user in which the second authentication processing by the via-internet authentication unit 17 is not successful.

The authentication history acquisition unit 13 acquires, from among pieces of the authentication history information (refer to FIG. 8) stored in the storage unit 16, a piece of authentication history information being associated with a user in which authentication processing by the first authentication unit 12 or the second authentication unit 19 is successful.

The determination unit 14 determines authentication information necessary for passing the first authentication point, based on authentication history information acquired by the authentication history acquisition unit 13. A condition for passing the first authentication point is determined in advance, and stored in the storage unit 16. The determination unit 14 determines, based on the condition, a type of authentication information necessary for passing the first authentication point. Note that, "processing of determining a type of authentication information (such as face information or user identification information) necessary for passing the first authentication point" is equivalent to "processing of determining a type of authentication processing (such as face authentication processing, or authentication processing using user identification information) necessary for passing the first authentication point". In other words, it can be said that processing of the determination unit 14 is "determining a type of authentication processing necessary for passing the first authentication point, based on authentication history information acquired by the authentication history acquisition unit 13".

For example, a condition for passing the first authentication point is "authentication processing using authentication information acquired by the authentication information acquisition apparatus 1 installed at the first authentication point is successful", and "second authentication processing using authentication information of the second type is successful". Note that, it also can be said that "authentication processing using authentication information" is "authentication processing based on authentication information", "authentication processing in which authentication information is referred to", and the like.

The determination unit 14 determines, as authentication information necessary for a user in which information that the second authentication processing is successful is not registered in authentication history information to pass the first authentication point, "authentication information acquirable by the authentication information acquisition apparatus 1 installed at the first authentication point", and "second authentication information".

On the other hand, the determination unit 14 determines, as authentication information necessary for a user in which information that the second authentication processing is successful is registered in authentication history information to pass the first authentication point, "authentication information acquirable by the authentication information acquisition apparatus 1 installed at the first authentication point".

The passage processing unit 15 performs processing of allowing a user in which authentication processing using authentication information of a type determined by the determination unit 14 is successful to pass. In a case where pieces of authentication information of a plurality of types are determined by the determination unit 14, the passage processing unit 15 allows a user in which all pieces of authentication processing using the authentication information of the plurality of types are successful to pass. Processing of passing is inputting a predetermined control signal to a passage control mechanism (such as a gate or a door) for controlling passage of a person, operating the passage control mechanism, and bringing the passage control mechanism to a state capable of passing a person (such as a state that a gate is opened, a state that a door is opened, or a state that locking of a door is unlocked).

"Flow of Processing"

Next, a flow of processing of the authentication system 10 is described by using FIGS. 4, 9, 10, and 21.

First, a user who has come to another authentication point (entrance of the first area) in FIG. 4 inputs authentication information to the authentication information acquisition apparatus 1 included in the local system 100.

In a case where the authentication information acquisition apparatus 1 configured to be able to acquire pieces of authentication information of a plurality of types is installed at the illustrated another authentication point, the user inputs, to the authentication information acquisition apparatus 1, one piece of authentication information selected from among the pieces of authentication information. On the other hand, in a case where the authentication information acquisition apparatus 1 configured to be able to acquire only authentication information of one type is installed, the user inputs the authentication information to the authentication information acquisition apparatus 1. When the authentication information acquisition apparatus 1 (the first authentication information acquisition unit 11 or the second authentication information acquisition unit 18) acquires the authentication information (S30 in FIG. 21), the authentication information acquisition apparatus 1 transmits the acquired authentication information to the server 200.

The server 200 includes the first authentication unit 12 and the second authentication unit 19. The server 200 performs authentication processing using the authentication information acquired from the local system 100 (S31 in FIG. 21). In a case where authentication information of the first type is acquired from the local system 100, the first authentication unit 12 performs the first authentication processing. On the other hand, in a case where authentication information of the second type is acquired from the local system 100, the second authentication unit 19 performs the second authentication processing.

Figure 21:
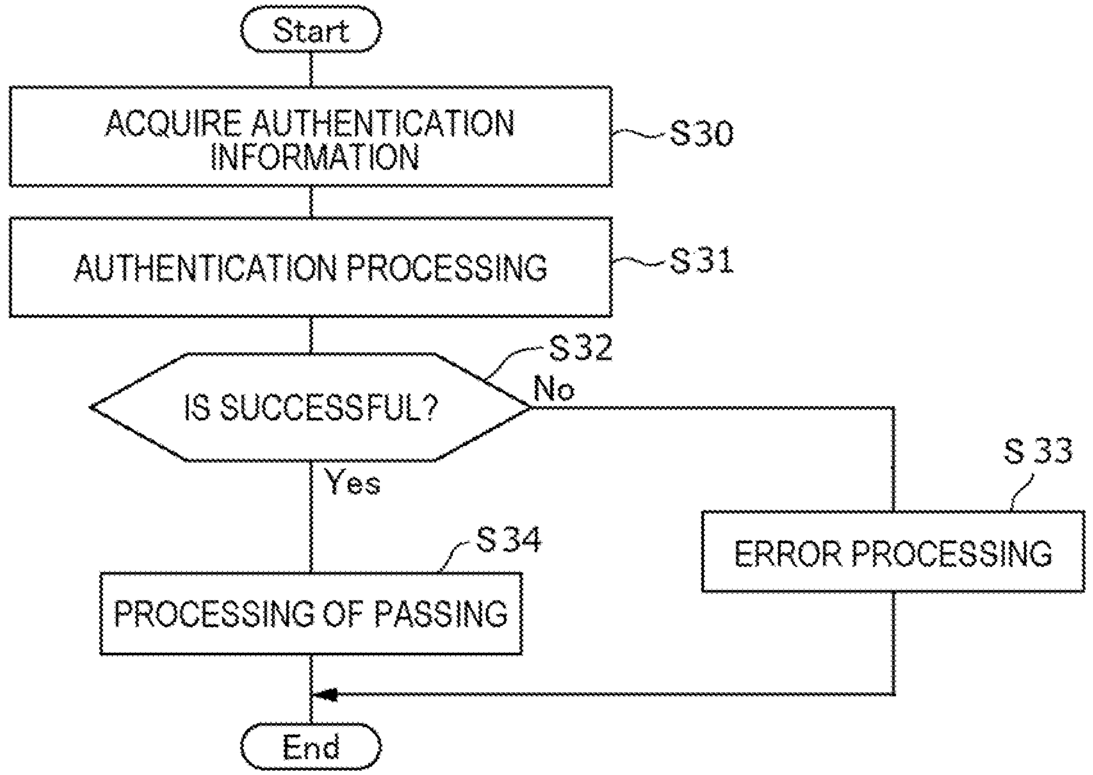
FIG. 21 It is a flowchart illustrating one example of a flow of processing of the authentication system according to the present example embodiment.

In a case where authentication has failed (No in S32 in FIG. 21), the server 200 and the local system 100 perform error processing (S33 in FIG. 21). For example, the server 200 notifies the local system 100 of a fact that authentication has failed. Then, the local system 100 notifies the user of a fact that authentication has failed by turning on a warning lamp, outputting a buzzer sound, or displaying information on a display.

On the other hand, in a case where authentication is successful (Yes in S32 in FIG. 21), the passage processing unit 15 performs processing of allowing the user in which authentication processing is successful to pass (S34 in FIG. 21).

Note that, although not illustrated, in a case where authentication processing is successful in S31 in FIG. 21, the type of authentication information used in authentication processing is registered in authentication history information as illustrated in FIG. 8 at any timing.

A user in which passage of the another authentication point is allowed, and who has entered the first area, thereafter, comes to the first authentication point illustrated in FIG. 4. Note that, the user may pass or may not pass the another authentication point before coming to the illustrated first authentication point.

The user who has come to the first authentication point in FIG. 4 inputs authentication information to the authentication information acquisition apparatus 1 included in the local system 100.

The authentication information acquisition apparatus 1 (first authentication information acquisition unit 11) configured to be able to acquire only authentication information of the first type is installed at the illustrated first authentication point. The user inputs authentication information of the first type to the authentication information acquisition apparatus 1. When the authentication information acquisition apparatus 1 (first authentication information acquisition unit 11) acquires the authentication information of the first type (S10 in FIG. 9), the authentication information acquisition apparatus 1 transmits the acquired authentication information of the first type to the server 200.

Figure 9:
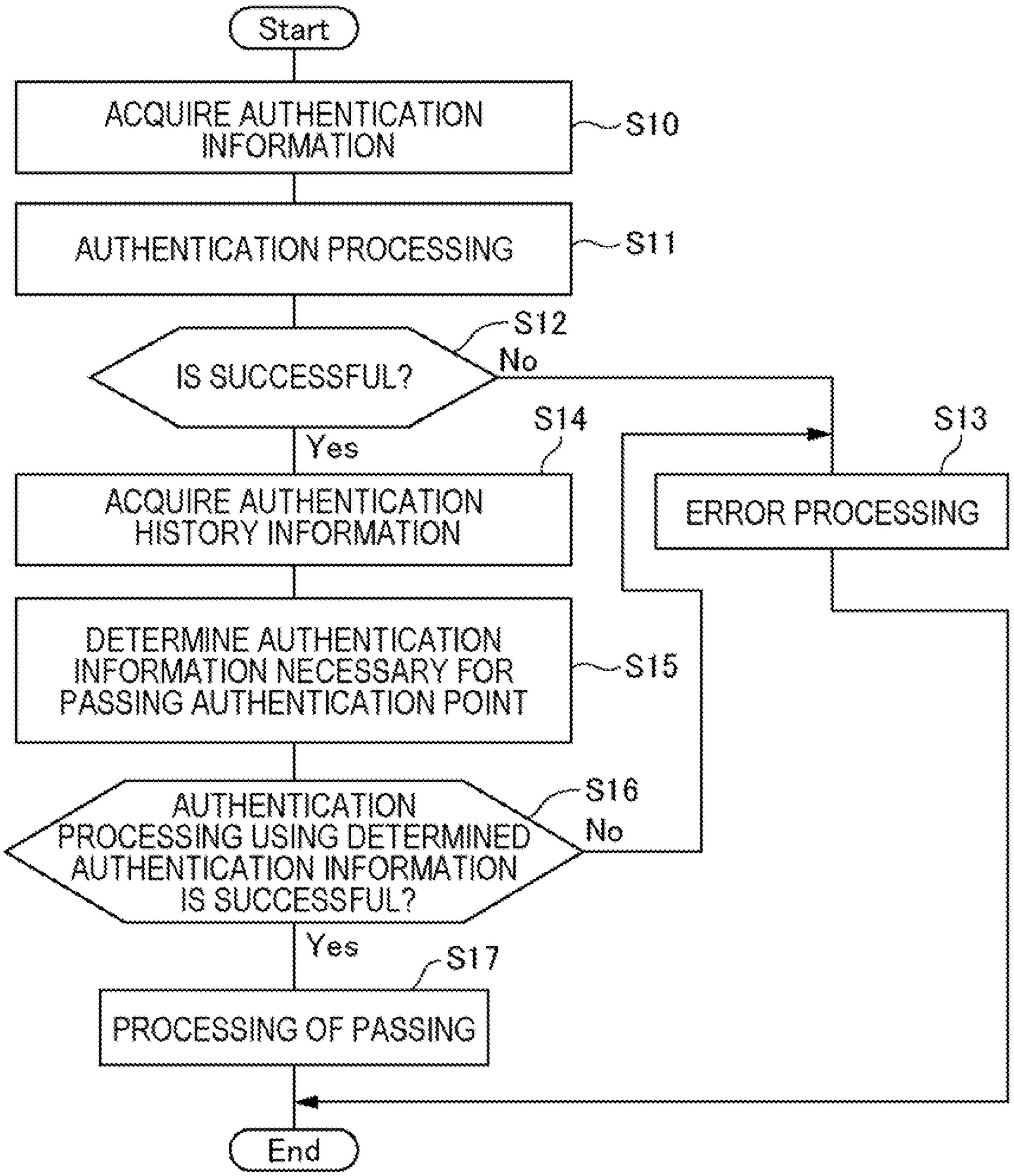
FIG. 9 It is a flowchart illustrating one example of a flow of processing of the authentication system according to the present example embodiment.

The server 200 performs the first authentication processing using the authentication information of the first type that has been acquired from the local system 100 (S11 in FIG. 9). Specifically, the first authentication unit 12 performs the first authentication processing.

In a case where authentication has failed (No in S12 in FIG. 9), the server 200 and the local system 100 perform error processing (S13 in FIG. 9). For example, the server 200 notifies the local system 100 of a fact that authentication has failed. Then, the local system 100 notifies the user of a fact that authentication has failed by turning on a warning lamp, outputting a buzzer sound, or displaying information on a display.

On the other hand, in a case where authentication is successful (Yes in S12 in FIG. 9), the authentication history acquisition unit 13 extracts, from the storage unit 16, authentication history information being associated with the user (S14 in FIG. 9).

Then, the determination unit 14 determines authentication information necessary for passing the first authentication point, based on the extracted authentication history information (S15 in FIG. 9).

A condition for passing the illustrated first authentication point is, for example, "authentication processing using authentication information acquired by the authentication information acquisition apparatus 1 installed at the first authentication point is successful", and "second authentication processing using authentication information of the second type is successful".

The determination unit 14 determines, as authentication information necessary for the user in which information that the second authentication processing is successful is not registered in authentication history information to pass the first authentication point, "authentication information acquirable by the authentication information acquisition apparatus 1 installed at the first authentication point", and "authentication information of the second type".

On the other hand, the determination unit 14 determines, as authentication information necessary for the user in which information that the second authentication processing is successful is registered in authentication history information to pass the first authentication point, "authentication information acquirable by the authentication information acquisition apparatus 1 installed at the first authentication point".

Then, the passage processing unit 15 performs processing of allowing the user in which all pieces of authentication processing using the above-described determined authentication information are successful to pass (Yes in S16, and S17 in FIG. 9). On the other hand, the passage processing unit 15 performs the above-described error processing for the user in which authentication processing using at least one of the above-described determined pieces of authentication information is not successful (S13 in FIG. 9). In error processing at this time, the passage processing unit 15 may notify the user of a reason why the user cannot pass. For example, a message such as "authentication processing using input authentication information of the first type is successful, but you cannot pass because authentication processing using authentication information of the second type is not successful", or "you cannot pass because authentication processing using input authentication information of the first type has failed" may be output via a predetermined output apparatus.

Note that, although not illustrated, in a case where authentication processing is successful in S11 in FIG. 9, the type of authentication information used in the authentication processing is registered in authentication history information as illustrated in FIG. 8 at any timing.

A user who is allowed to pass the first authentication point passes the first authentication point illustrated in FIG. 4, and enters the second area. On the other hand, a user who has failed authentication processing using authentication information of the first type inputs again authentication information of the first type to the authentication information acquisition apparatus 1, and performs work such as performing re-authentication processing.

Further, a user who cannot pass because authentication processing using authentication information of the second type is not successful operates the user terminal 300, and inputs, to the user terminal 300, authentication information of the second type via the authentication information acquisition means of the second type (such as a camera, a fingerprint sensor, or a microphone) included in the user terminal 300. Then, the user performs a predetermined operation with respect to the user terminal 300, and transmits, to the authentication system 10, the authentication information of the second type that has been input to the user terminal 300.

Figure 10:
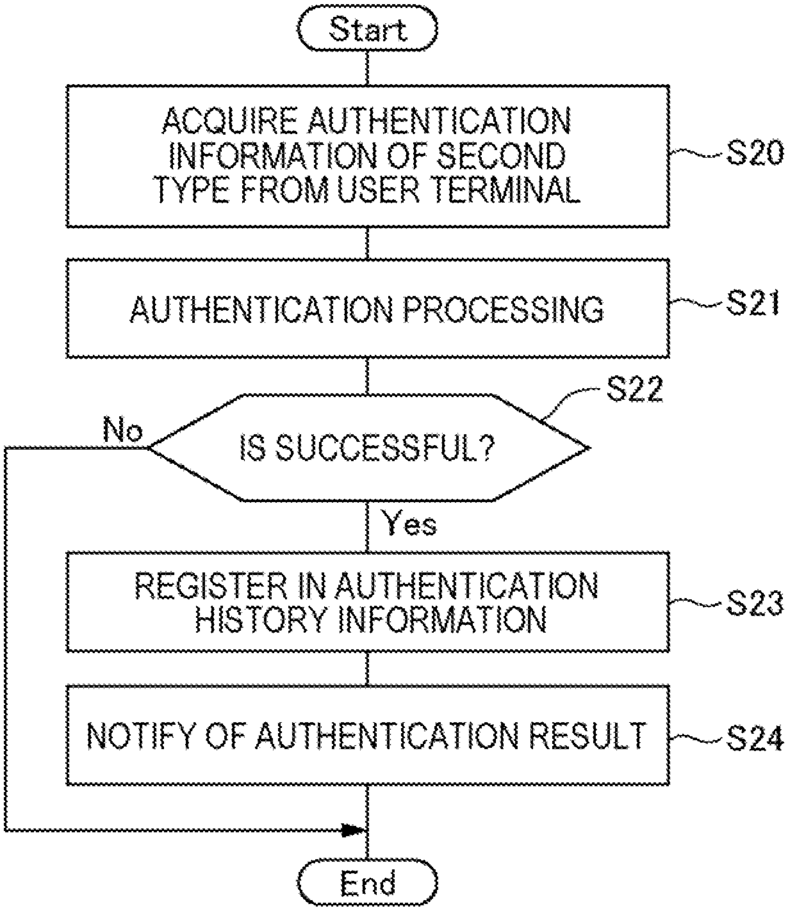
FIG. 10 It is a flowchart illustrating one example of a flow of processing of the authentication system according to the present example embodiment.

When the via-internet authentication unit 17 acquires authentication information of the second type that has been transmitted from the user terminal 300 via the Internet (S20 in FIG. 10), the via-internet authentication unit 17 performs authentication processing, based on the authentication information of the second type (S21 in FIG. 10). In a case where authentication is successful (Yes in S22 in FIG. 10), the via-internet authentication unit 17 registers, in authentication history information as illustrated in FIG. 8, a fact that authentication is successful (S23 in FIG. 10). Subsequently, the via-internet authentication unit 17 transmits the authentication result to the user terminal 300 (S24 in FIG. 10).

Thereafter, the user inputs again, to the authentication information acquisition apparatus 1, authentication information of the first type at the first authentication point illustrated in FIG. 4, and performs authentication processing. At this time, since information that the second authentication processing is successful is registered, a condition that "second authentication processing using authentication information of the second type is successful" among the conditions for passing the first authentication point is satisfied. Therefore, the user can pass the first authentication point, as long as a condition that "authentication processing using authentication information that has been acquired by the authentication information acquisition apparatus 1 installed at the first authentication point is successful" is satisfied by the authentication processing this time.

"Description on Specific Case"

A specific case is described by using FIG. 11. An illustrated authentication point A is associated with the another authentication point installed in an entrance of the first area in FIG. 4. An illustrated authentication point B is associated with the first authentication point installed in an entrance of the second area in FIG. 4.

At the authentication point A, face authentication and authentication processing using user identification information stored in an IC card or the like can be selectively utilized. At the authentication point B, only authentication processing using user identification information stored in an IC card or the like can be utilized.

A condition for passing the authentication point A is "authentication processing using authentication information that has been acquired by the authentication information acquisition apparatus 1 installed at the authentication point A is successful".

A condition for passing the authentication point B is "authentication processing using authentication information that has been acquired by the authentication information acquisition apparatus 1 installed at the authentication point B is successful", and "face authentication is successful".

Mr./Ms. A has passed the authentication point A by face authentication. Thereafter, Mr./Ms. A performed authentication processing using his/her user identification information stored in an IC card or the like at the authentication point B in a state where face authentication via the Internet is not performed, and the authentication processing has been successful. For Mr./Ms. A as described above, the determination unit 14 determines, as authentication information necessary for passing the authentication point B and entering the second area, authentication information acquirable by the authentication information acquisition apparatus 1 installed at the authentication point B. Then, Mr./Ms. A in which authentication processing using the determined authentication information is successful is allowed to pass the authentication point B, and enter the second area.

Mr./Ms. B has passed the authentication point A by authentication processing using his/her user identification information stored in an IC card or the like. Thereafter, Mr./Ms. B has performed face authentication via the Internet, and then, has performed authentication processing using his/her user identification information stored in the IC card or the like at the authentication point B, and authentication processing has been successful. For Mr./Ms. B as described above, the determination unit 14 determines, as authentication information necessary for passing the authentication point B and entering the second area, authentication information acquirable by the authentication information acquisition apparatus 1 installed at the authentication point B. Then, Mr./Ms. B in which authentication processing using the determined authentication information is successful is allowed to pass the authentication point B, and enter the second area.

Mr./Ms. C has passed the authentication point A by authentication processing using his/her user identification information stored in an IC card or the like. Thereafter, Mr./Ms. C has performed authentication processing using his/her user identification information stored in the IC card or the like at the authentication point B in a state where face authentication via the Internet is not performed, and authentication processing has been successful. For Mr./Ms. C as described above, the determination unit 14 determines, as authentication information necessary for passing the authentication point B and entering the second area, authentication information acquirable by the authentication information acquisition apparatus 1 installed at the authentication point B, and face information. Then, Mr./Ms. C in which authentication processing using face information is not successful is not allowed to pass the authentication point B, and enter the second area. Note that, thereafter, for example, in a case where face authentication via the Internet is successful, and then, thereafter, authentication at the authentication point B again is successful, Mr./Ms. C is allowed to pass the authentication point B, and enter the second area.

Mr./Ms. D has passed the authentication point A by authentication processing using user identification information of Mr./Ms. A stored in an IC card or the like. Thereafter, Mr./Ms. D has performed authentication processing using the user identification information of Mr./Ms. A stored in the IC card or the like at the authentication point B in a state where face authentication via the Internet is not performed, and authentication processing has been successful. Regarding Mr./Ms. D who has entered the first area by utilizing the user identification information of Mr./Ms. A, information that Mr./Ms. D has entered the first area, more specifically, information that Mr./Ms. D has entered the first area by utilizing face information is not registered. For Mr./Ms. D as described above, the determination unit 14 determines, as authentication information necessary for passing the authentication point B and entering the second area, authentication information acquirable by the authentication information acquisition apparatus 1 installed at the authentication point B, and face information. Then, Mr./Ms. D in which authentication using face information is not successful is not allowed to pass the authentication point B, and enter the second area.

Mr./Ms. E has passed the authentication point A by face authentication. However, face authentication was successful in a state where Mr./Ms. E is erroneously recognized as Mr./Ms. A due to a mistake of a computer. Therefore, information that Mr./Ms. A has passed the authentication point A by face authentication is registered in authentication history information, and information that Mr./Ms. E has passed the authentication point A by face authentication is not registered. Thereafter, Mr./Ms. E has performed authentication processing using his/her user identification information stored in an IC card or the like at the authentication point B in a state where face authentication via the Internet is not performed, and authentication processing has been successful. Regarding Mr./Ms. E who has entered the first area in a state where Mr./Ms. E is erroneously recognized as Mr./Ms. A, information that Mr./Ms. E has entered the first area, more specifically, information that Mr./Ms. E has entered the first area by utilizing face information is not registered. For Mr./Ms. E as described above, the determination unit 14 determines, as authentication information necessary for passing the authentication point B and entering the second area, authentication information acquirable by the authentication information acquisition apparatus 1 installed at the authentication point B, and face information. Then, Mr./Ms. E in which authentication using face information is not successful is not allowed to pass the authentication point B, and enter the second area. Note that, thereafter, for example, in a case where face authentication via the Internet is successful, and then, thereafter, authentication at the authentication point B again is successful, Mr./Ms. E is allowed to pass the authentication point B, and enter the second area.

In this way, the determination unit 14 can determine, as authentication information necessary for a user in which face information is determined as authentication information being used when entering the first area to enter the second area, user identification information read by a reader (authentication information acquirable by the authentication information acquisition apparatus 1 installed in an entrance of the second area).

Further, the determination unit 14 can determine, as authentication information necessary for a user in which user identification information read by the reader is determined as authentication information being used when entering the first area to enter the second area, user identification information read by the reader (authentication information acquirable by the authentication information acquisition apparatus 1 installed in an entrance of the second area), and face information.

Further, the determination unit 14 can determine, as authentication information necessary for a user in which authentication information being used when entering the first area is not determined to be face information to enter the second area, user identification information read by the reader (authentication information acquirable by the authentication information acquisition apparatus 1 installed in an entrance of the second area), and face information.

Further, the determination unit 14 can determine, as authentication information necessary for a user in which entry to the first area is not registered to enter the second area, user identification information read by the reader (authentication information acquirable by the authentication information acquisition apparatus 1 installed in an entrance of the second area), and face information.

"Advantageous Effect"

As described above, the authentication system 10 according to the present example embodiment can determine, for each user, a type of authentication information necessary for passing a certain authentication point, based on a type of authentication processing that has been performed so far at another authentication point or the like in a system for performing multistage authentication within a facility. Configuring as described above can avoid an inconvenience that authentication processing using authentication information of a certain type is unnecessarily performed plural times at a plurality of authentication points. Meanwhile, it is possible to set, as a condition for passing any authentication point, a condition that authentication processing using authentication information of a certain type is successful at any authentication point or via the Internet. Consequently, a technique for maintaining a high level of security without waste is achieved in a system for performing multistage authentication.

Further, in a case where it is possible to pass the first authentication point in a case where a predetermined condition is satisfied by a plurality of authentication among multistage authentication as described in the present example embodiment, a degree of freedom of a configuration of the authentication information acquisition apparatus 1 to be installed at each authentication point is increased. In other words, as described in the above-described example embodiment, it is possible to set a condition that, for example, "face authentication" is necessary to pass the first authentication point, however, also in this case, it is not necessarily required to install the authentication information acquisition apparatus 1 for acquiring face information at the first authentication point. This is because, for example, in a case where face authentication is successful at another authentication point, the condition for passing the first authentication point is satisfied.

In this way, in a case where a degree of freedom of a configuration of the authentication information acquisition apparatus 1 to be installed at each authentication point is high, it is possible to reduce cost burden by installing the authentication information acquisition apparatus 1. For example, in a case where modification from an existing system is conceived, re-installing a new authentication information acquisition apparatus 1 at all authentication points increases cost burden. In a case of the present example embodiment, it is possible to re-install an authentication information acquisition apparatus 1 for acquiring authentication information of a new type only at some of a plurality of authentication points, and continue to utilize the existing authentication information acquisition apparatus 1 at other authentication points. Then, also at an authentication point where the authentication information acquisition apparatus 1 for acquiring authentication information of a new type is not installed, it is possible to set, as a passing condition, a condition that authentication processing using the authentication information of the new type is successful.

Further, in the present example embodiment, since there is a degree of freedom regarding a type of authentication processing to be performed at each authentication point, and an order of authentication points where a user passes, a type of authentication processing that has been performed so far at a point of time when the user has come to a certain authentication point may differ for each user. In view of the above, in the present example embodiment, a type of authentication processing that has been performed in a past period is managed for each user by utilizing authentication history information. Therefore, it is possible to accurately recognize a type of authentication processing that has been performed so far at a point of time when coming to a certain authentication point.

Second Example Embodiment

An authentication system 10 according to a present example embodiment is different from that of the first example embodiment in a point that the authentication system 10 according to the present example embodiment includes a function of preventing impersonation in authentication processing by a via-internet authentication unit 17.

The via-internet authentication unit 17 acquires, from a user terminal 300, position information of the user terminal 300, in addition to authentication information of a second type. The position information is information indicating a current position of the user terminal 300, and can be set, for example, as global positioning system (GPS) information.

The via-internet authentication unit 17 determines whether position information of the user terminal 300 is present within a predetermined area. The predetermined area is, for example, the entirety or a part of an area of a facility where the authentication system 10 is installed.

Then, in a case where a position indicated by position information of the user terminal 300 is present within a predetermined area, and second authentication processing using authentication information of a second type which has been acquired from the user terminal 300 is successful, the via-internet authentication unit 17 registers, in authentication history information, information that the second authentication processing is successful.

Other configurations of the authentication system 10 are similar to those of the first example embodiment.

The authentication system 10 according to the present example embodiment achieves an advantageous effect similar to that of the first example embodiment. Further, the authentication system 10 according to the present example embodiment can prevent impersonation of a user. Consequently, it becomes possible to maintain a high level of security.

Third Example Embodiment

Figure 22:
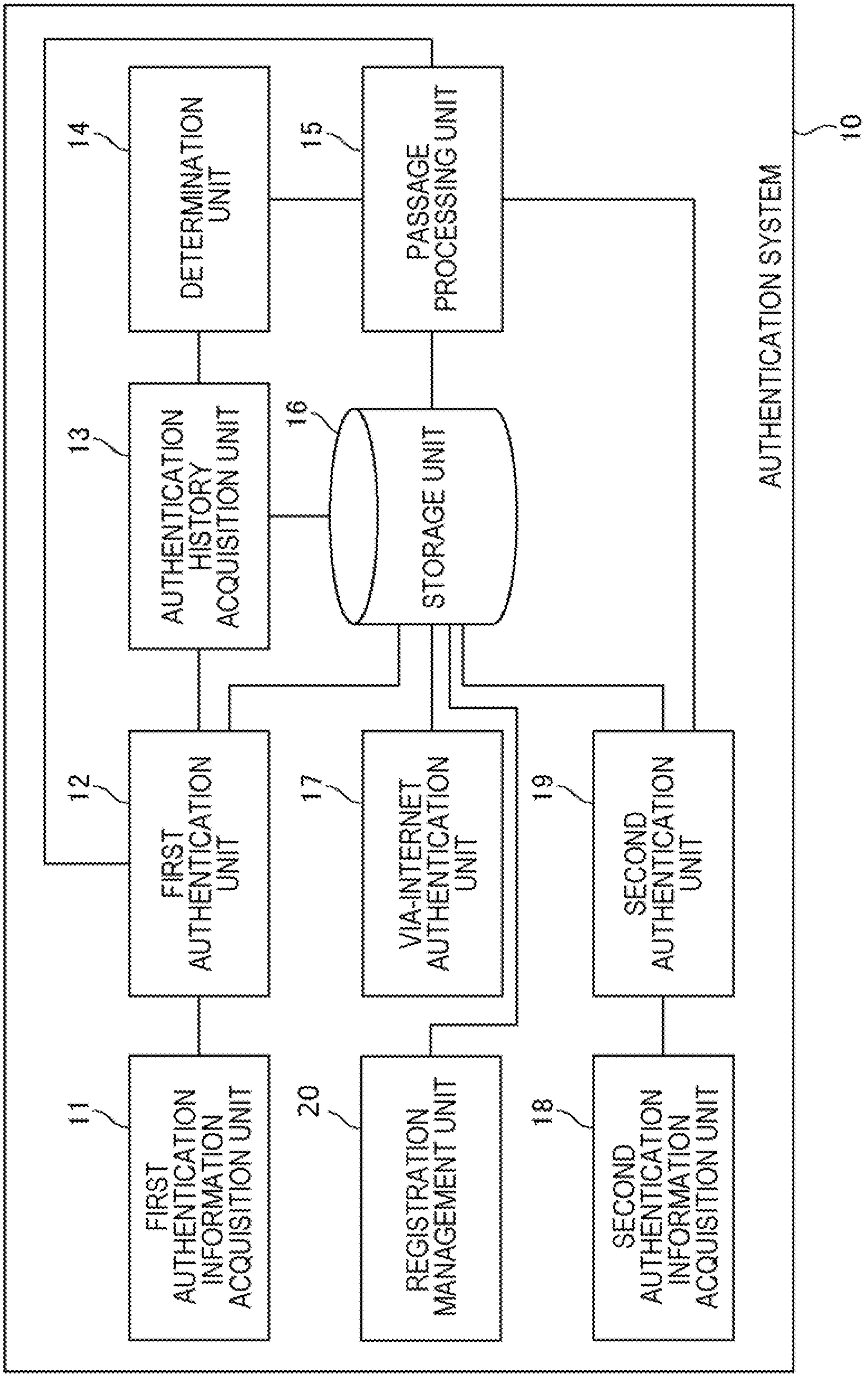
FIG. 22 It is one example of a functional block diagram of the authentication system according to the present example embodiment.

In a present example embodiment, one example of processing of registering authentication information (reference data) in an authentication system 10 is described. As illustrated in FIG. 22, the authentication system 10 according to the present example embodiment is different from that of the first and second example embodiments in a point that the authentication system 10 according to the present example embodiment further includes a registration management unit 20.

Figure 12:
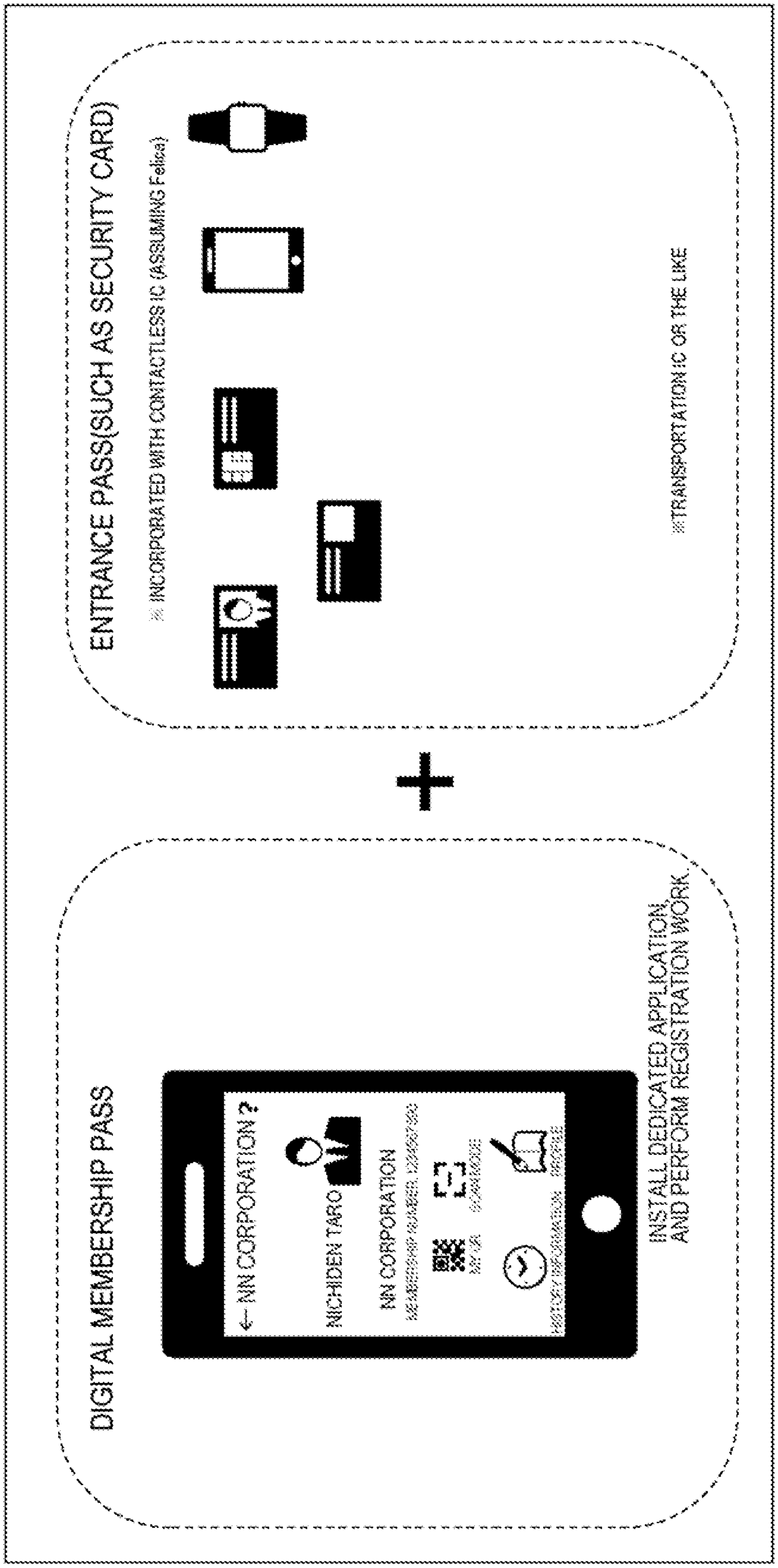
FIG. 12 It is a diagram illustrating one example of information to be utilized by the authentication system according to the present example embodiment.

In the present example embodiment, a user becomes to own a digital membership pass as illustrated in FIG. 12, and an entrance pass. A user can acquire a digital membership pass as illustrated in FIG. 12 by installing a dedicated application in a user terminal 300, and performing registration work (such as registration of face information, or registration of user identification information) according to an instruction of the application. Further, a user can register and utilize, as an entrance pass, an IC card owned by himself/herself, for example, a transportation IC card.

—Processing of Registering IC Card as Entrance Pass—

Figure 13:
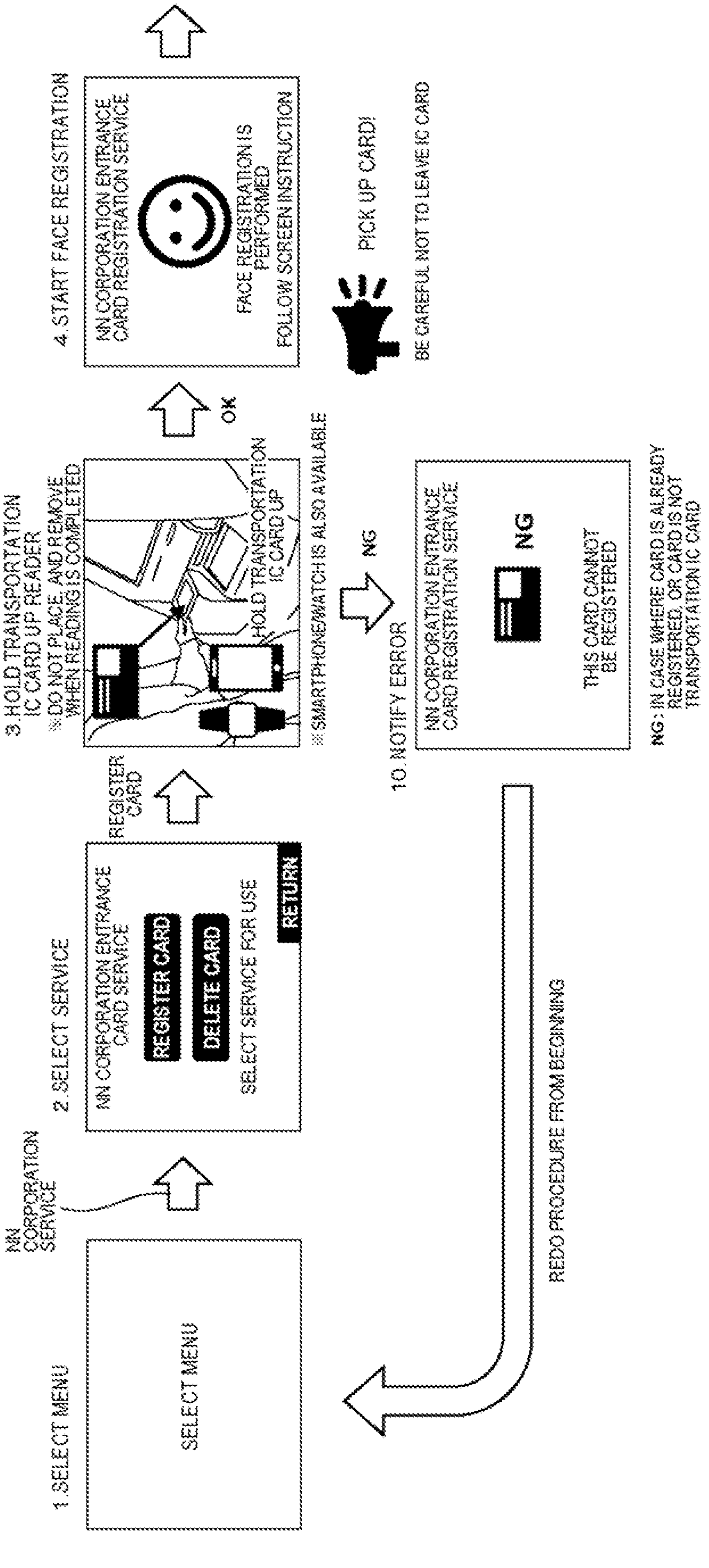
FIG. 13 It is a diagram illustrating one example of registration processing of the authentication system according to the present example embodiment.
Figure 14:
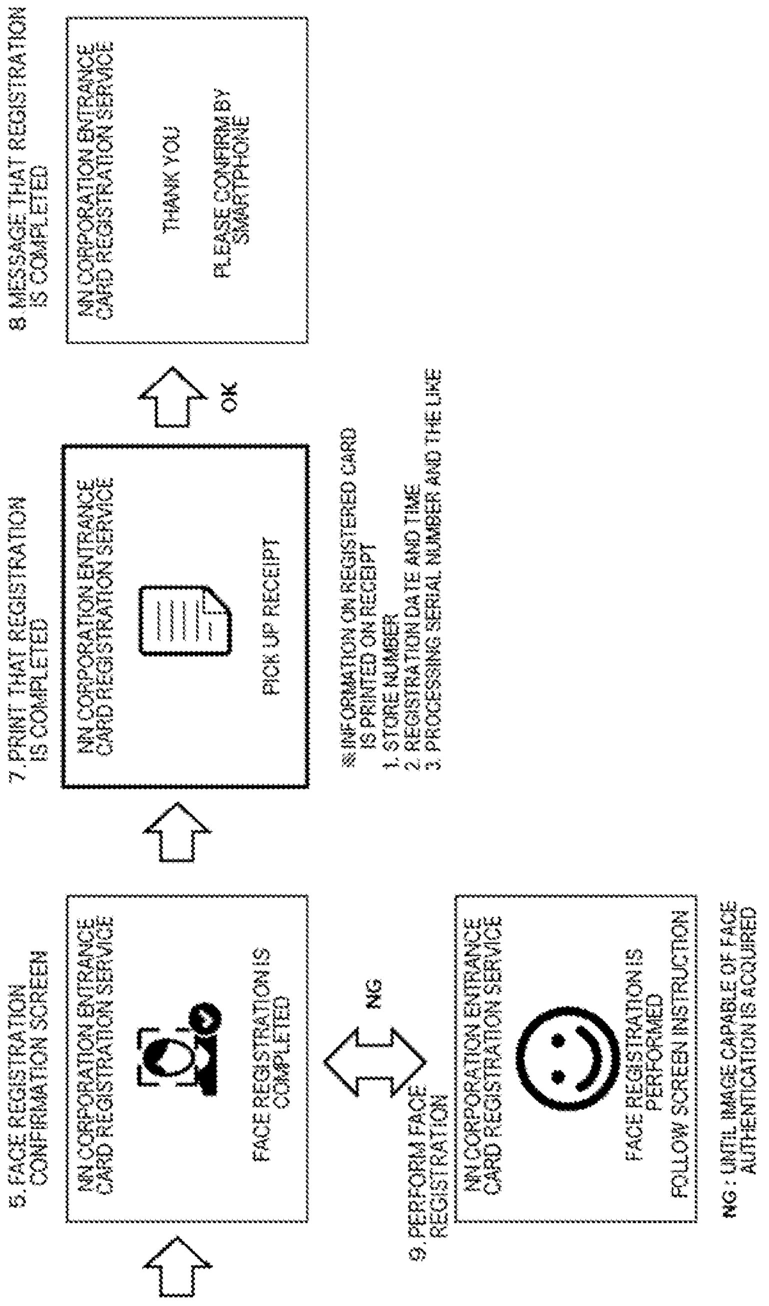
FIG. 14 It is a diagram illustrating one example of registration processing of the authentication system according to the present example embodiment.
Figure 15:
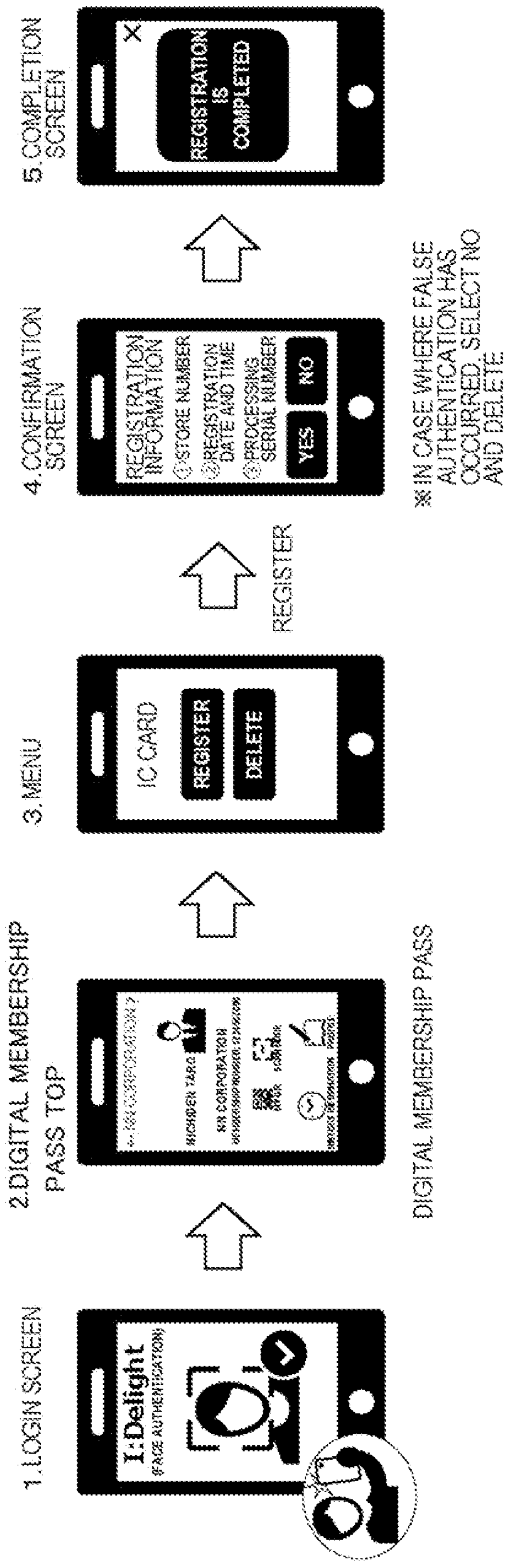
FIG. 15 It is a diagram illustrating one example of registration processing of the authentication system according to the present example embodiment.

Herein, one example of processing of registering an IC card owned by himself/herself as an entrance pass, and processing of registering his/her biological information as authentication information (reference data) is described by using FIGS. 13 to 15. Processing to be performed by the authentication system 10 to be described in the following is achieved by the registration management unit 20. Herein, processing of registering an entrance pass for allowing an employee of NN Corporation to enter a facility of NN Corporation is described as an example.

First, as illustrated in FIG. 13-1, a user operates a predetermined terminal apparatus, and selects a predetermined menu (a service menu for NN Corporation). The predetermined terminal apparatus may be an apparatus installed and utilized for general purpose in a convenience store, a station, an airport, or the like, or may be other than the above. The predetermined terminal apparatus is communicably connected to the authentication system 10.

Subsequently, as illustrated in FIG. 13-2, the user selects, from the service menu for NN Corporation, a service (card registration) of registering an IC card as an entrance pass.

Subsequently, as illustrated in FIG. 13-3, the user holds an IC card (or a smartphone, a smartwatch, a mobile phone, or the like storing information on an IC card) to be registered as an entrance pass up a reader of the predetermined terminal apparatus, and causes the predetermined terminal apparatus to read information on the IC card (such as information indicating a type of an IC card, or card identification information). The predetermined terminal apparatus transmits the input IC card information to the authentication system 10. Then, the authentication system 10 determines whether the input IC card information is appropriate as an IC card to be registered. For example, in a case where the IC card is not an IC card of a predetermined type (example: a transportation IC card), or in a case where the IC card is an already registered IC card, the authentication system 10 determines that the IC card is inappropriate. In a case where it is determined that the IC card is inappropriate, the authentication system 10 transmits the fact to the predetermined terminal apparatus. In response to this, as illustrated in FIG. 13-10, the predetermined terminal apparatus performs error notification to the user.

On the other hand, in a case where it is determined that the IC card is appropriate, the authentication system 10 notifies the predetermined terminal apparatus of the fact. In response to this, as illustrated in FIG. 13-4, the predetermined terminal apparatus starts registration processing of face information.

When a face image is generated by photographing the user, the predetermined terminal apparatus transmits the face image to the authentication system 10. The authentication system 10 determines whether the received face image is appropriate as an image to be registered (such as whether a size of a face is an appropriate size, or whether it is possible to extract a predetermined feature value). In a case where the face image is appropriate, the authentication system 10 stores, in a storage apparatus, the received face image and the above-described IC card information in association with each other. Then, the authentication system 10 notifies the predetermined terminal apparatus of a determination result.

In a case where the received face image is appropriate as an image to be registered, as illustrated in FIG. 14-5, the predetermined terminal apparatus notifies about a fact that registration of the face image is completed, and subsequently, as illustrated in FIGS. 14-7 and 8, the predetermined terminal apparatus outputs a guidance of outputting a receipt, a guidance of finishing the service, or the like. Further, the predetermined terminal apparatus transmits information printed on a receipt to the authentication system 10. The authentication system 10 stores, in the storage apparatus, the received information in association with the above-described face image or IC card information. The information to be printed on the receipt is information (such as store information or station information) indicating a position where the predetermined terminal apparatus is installed, a registration date and time, a processing number, and the like, but the present example embodiment is not limited thereto.

On the other hand, in a case where the received face image is inappropriate as an image to be registered, the predetermined terminal apparatus notifies the user of a fact, and, as illustrated in FIG. 14-9, the predetermined terminal apparatus performs photographing of a face image again.

After performing processing illustrated in FIGS. 13 and 14, as illustrated in FIGS. 15-1 and 2, the user operates the user terminal 300, and logs in the authentication system 10 via a dedicated application. Thereafter, as illustrated in FIG. 15-3, the user selects, from a menu screen of the application, a screen for registering an IC card. In response to this, the authentication system 10 reads information on the user from among pieces of "information in which IC card information and face information are associated with each other" registered in the authentication system 10 by the processing illustrated in FIGS. 13 and 14. There are various means for reading user information. For example, the means may be achieved by collation between face information registered as a digital membership pass, and face information registered in association with IC card information.

Thereafter, as illustrated in FIG. 15-4, information read from among pieces of "information in which IC card information and face information are associated with each other" registered in the authentication system 10 by the processing illustrated in FIGS. 13 and 14 is transmitted from the authentication system 10 to the user terminal 300, and is displayed on a screen of the user terminal 300. The user collates the information with the receipt information output in FIG. 14-7, and when confirming that there is no mistake, the user inputs, to the user terminal 300, a fact (touch an illustrated Yes). Subsequently, the user terminal 300 transmits the input content to the authentication system 10. In response to the input, the authentication system 10 registers the read "information in which IC card information and face information are associated with each other" in association with membership information of the user. Thereafter, the user can utilize the registered IC card as an entrance pass. Note that, face information to be utilized as reference data in collation processing on face authentication in an authentication area that has been described in the first and second example embodiments may be face information registered at a time of generation of a digital membership pass, or may be face information registered at a time of registration of an IC card.

—Processing 1 of Deleting IC Card Registered as Entrance Pass—

Figure 16:
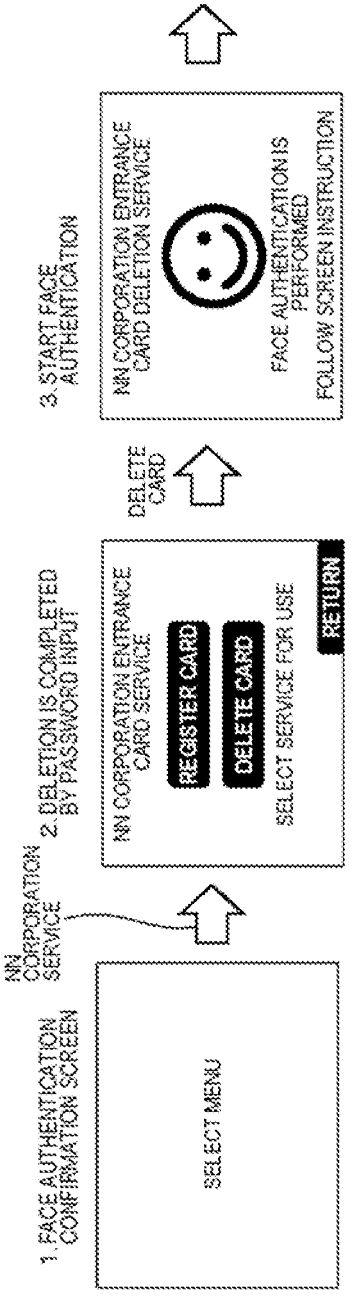
FIG. 16 It is a diagram illustrating one example of deletion processing of the authentication system according to the present example embodiment.
Figure 17:
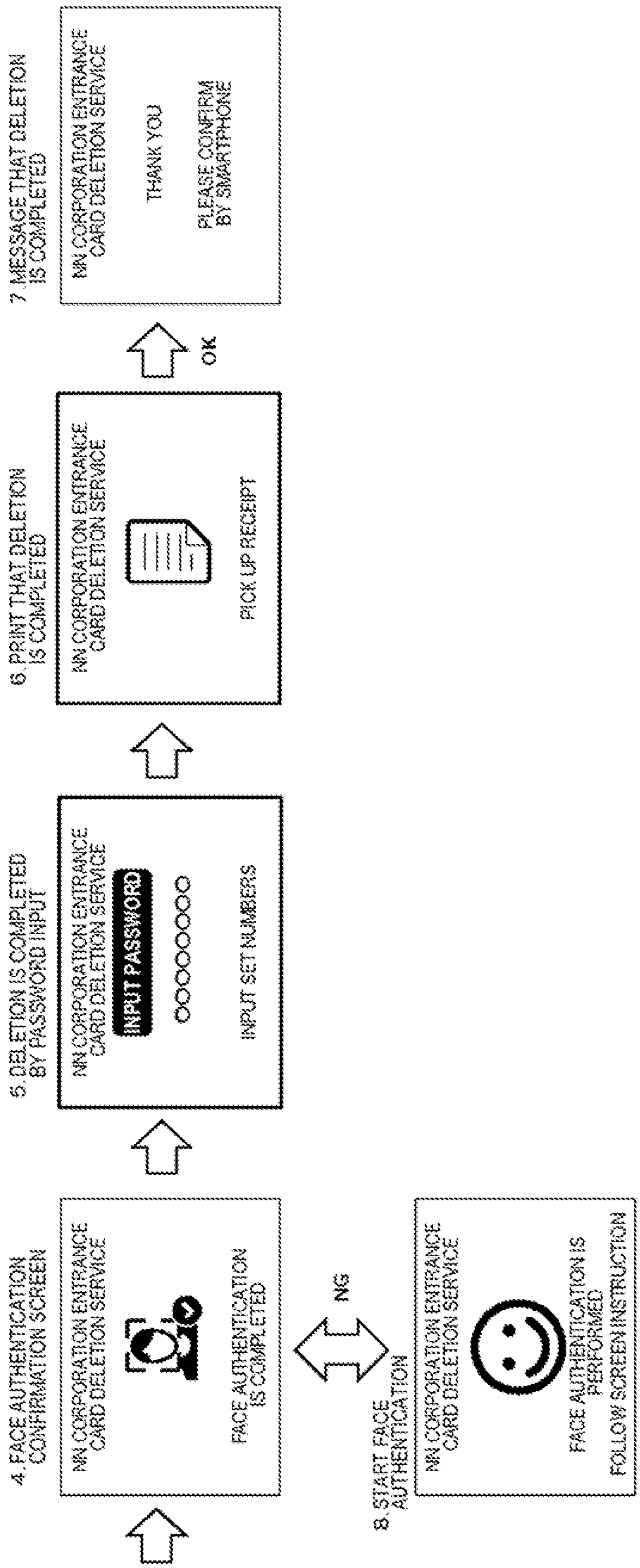
FIG. 17 It is a diagram illustrating one example of deletion processing of the authentication system according to the present example embodiment.

Next, one example of processing of deleting (cancelling registration) an IC card registered as an entrance pass is described by using FIGS. 16 and 17. Also in this case, processing of deleting an entrance pass for allowing an employee of NN Corporation to enter a facility of NN Corporation is described as an example.

First, as illustrated in FIG. 16-1, a user operates a predetermined terminal apparatus, and selects a predetermined menu (a service menu for NN Corporation). The predetermined terminal apparatus may be an apparatus installed and utilized for general purpose in a convenience store, a station, an airport, or the like, or may be other than the above. The predetermined terminal apparatus is communicably connected to the authentication system 10.

Subsequently, as illustrated in FIG. 16-2, the user selects, from the service menu for NN Corporation, a service (card deletion) of deleting a registered IC card. Then, as illustrated in FIG. 16-3, face authentication is started.

As illustrated in FIG. 16-4, when a face image is generated by photographing the user, the predetermined terminal apparatus transmits the face image to the authentication system 10. The authentication system 10 determines the user by face authentication using the received face image.

In a case where face authentication has failed, the authentication system 10 notifies the predetermined terminal apparatus of a fact. In response to this, as illustrated in FIG. 17-8, the predetermined terminal apparatus notifies the user of a fact that face authentication has failed, and guides the user to perform face authentication again.

On the other hand, in a case where face authentication is successful, the authentication system 10 notifies the predetermined terminal apparatus of a fact. In response to this, as illustrated in FIG. 17-5, the predetermined terminal apparatus accepts an input of a password. Then, the predetermined terminal apparatus transmits the input password to the authentication system 10. In a case where the input password is correct, the authentication system 10 deletes IC card information registered in association with the user, and notifies the predetermined terminal apparatus of a fact that deletion is completed. As illustrated in FIG. 17-6, the predetermined terminal apparatus notifies that deletion of the IC card is completed, and subsequently, as illustrated in FIG. 17-7, outputs a guidance of finishing the service or the like. Thereafter, the user cannot utilize the deleted IC card as an entrance pass.

Note that, the above-described password may be set in advance for each user. Settings of a password may be performed at a time of registration work of a digital membership pass, may be performed at a time of registration of an IC card illustrated in FIGS. 13 and 14, or may be performed at a time of work of associating IC card information and information on a digital membership pass with each other illustrated in FIG. 15.

—Processing 2 of Deleting IC Card Registered as Entrance Pass—

Figure 18:
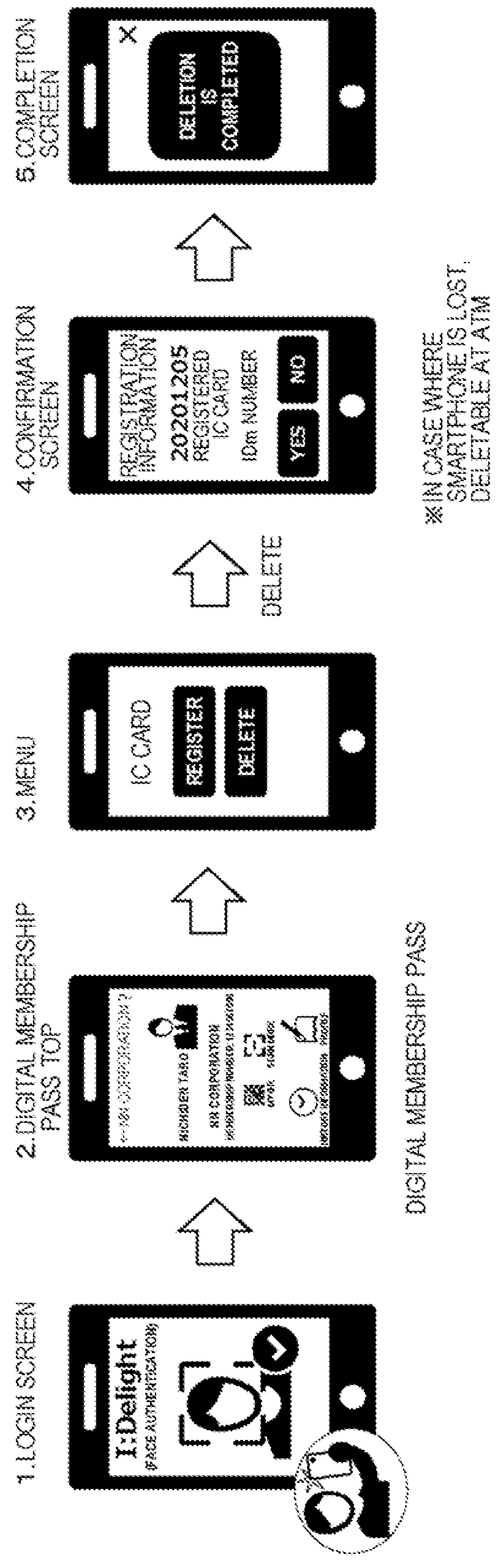
FIG. 18 It is a diagram illustrating one example of deletion processing of the authentication system according to the present example embodiment.

Next, another example of processing of deleting (cancelling registration) an IC card registered as an entrance pass is described by using FIG. 18. Also in this case, processing of deleting an entrance pass for allowing an employee of NN Corporation to enter a facility of NN Corporation is described as an example.

As illustrated in FIGS. 18-1 and 2, a user operates the user terminal 300, and logs in the authentication system 10 via a dedicated application. Thereafter, as illustrated in FIG. 18-3, the user selects, from a menu screen of the application, a screen for deleting an IC card.

Thereafter, the authentication system 10 reads IC card information registered in association with the user, and transmits the information to the user terminal 300. As illustrated in FIG. 18-4, the user terminal 300 displays the received IC card information, and prompts the user to confirm. Then, when information that the IC card is a target to be deleted is input, the user terminal 300 notifies the authentication system 10 of a fact. After the authentication system 10 deletes the IC card information registered in association with the user in response to the notification, the authentication system 10 notifies the user terminal 300 that deletion is completed. As illustrated in FIG. 18-5, the user terminal 300 notifies the user of a fact that deletion of the IC card is completed. Thereafter, the user cannot utilize the deleted IC card as an entrance pass.

As described above, after acquiring card identification information and a first face image, the registration management unit 20 can collate between a second face image included in digital membership pass data, and the first face image, and store, in a storage unit 16, the acquired card identification information and the digital membership pass data in association with each other, based on a collation result.

Note that, in a case where acquired card identification information and digital membership pass data are stored in the storage unit 16 in association with each other, the registration management unit 20 may transmit information of notifying that association is completed to a terminal associated with the digital membership pass data with which the acquired card identification information is associated. For example, these pieces of processing may be achieved via the above-described dedicated application.

Further, as illustrated in FIGS. 15, 16, and 18, the registration management unit 20 can display, on a screen after login with use of digital membership pass data, a button for canceling association with card identification information.

The authentication system 10 according to the present example embodiment achieves an advantageous effect similar to that of the first and second example embodiments. Further, in the authentication system 10 according to the present example embodiment, a user can register and delete an IC card by adopting various methods. Consequently, user's convenience is enhanced.

MODIFICATION EXAMPLES

Hereinafter, modification examples applicable to the first to third example embodiments are described. Also in the modification examples, an advantageous effect similar to that of the first to third example embodiments is achieved.

First Modification Example

Figure 19:
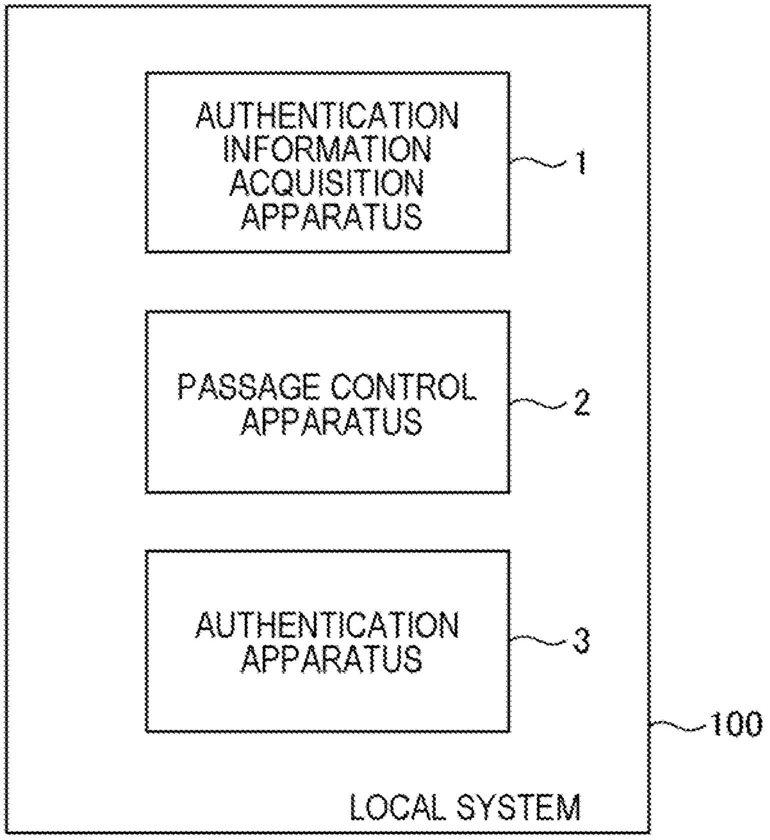
FIG. 19 It is one example of a functional block diagram of the local system according to the present example embodiment.
Figure 20:
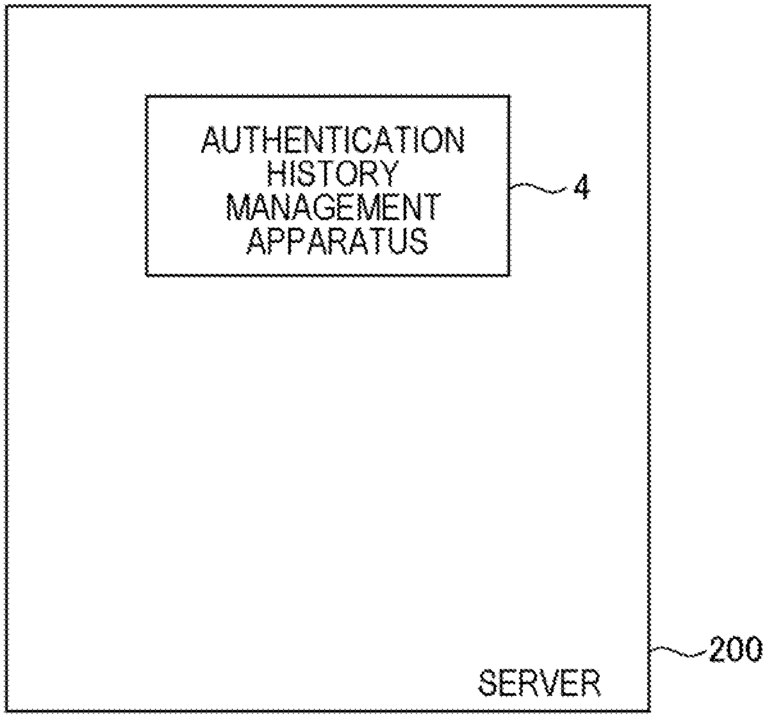
FIG. 20 It is one example of a functional block diagram of the server according to the present example embodiment.

As illustrated in FIGS. 19 and 20, a local system 100 may include an authentication information acquisition apparatus 1, a passage control apparatus 2, and an authentication apparatus 3, and a server 200 may include an authentication history management apparatus 4. In other words, the local system 100 may include the authentication apparatus 3.

Second Modification Example

An authentication system 10 may not include a server 200, but may be constituted only of a plurality of local systems 100. In this case, the local system 100 includes an authentication information acquisition apparatus 1, a passage control apparatus 2, an authentication apparatus 3, and an authentication history management apparatus 4. Each local system 100 manages authentication history information, and registers a history on authentication processing that has been performed by each local system 100. Then, synchronization processing of making contents of pieces of authentication history information to be managed by the plurality of local systems 100 coincident with each other is performed by any means.

Third Modification Example

In the above-described example embodiments, it is assumed that the authentication information acquisition apparatus 1 for acquiring authentication information of a second type is not installed at a first authentication point. As a modification example, an authentication information acquisition apparatus 1 for acquiring authentication information of the second type may also be installed at the first authentication point. Further, in a case where a plurality of first authentication points are installed within a facility, the authentication information acquisition apparatus 1 for acquiring authentication information of the second type may be installed at some of the plurality of first authentication points, or the authentication information acquisition apparatus 1 for acquiring authentication information of the second type may be installed at all of the plurality of first authentication points.

As described in the first example embodiment, in the authentication system 10 according to the present example embodiment, a degree of freedom of a configuration of the authentication information acquisition apparatus 1 to be installed at each authentication point increases. Therefore, a configuration described as the above-described modification example can also be adopted.

Fourth Modification Example

An authentication system 10 may not include a via-internet authentication unit 17. In this case, for example, second authentication processing utilizing a user terminal 300 may be performed by a method as described below.

A user activates a predetermined application of his/her user terminal 300, and inputs second authentication information. For example, the user may photograph his/her face, photograph his/her eye, input a fingerprint, or input voice. In response to this, the application performs the second authentication processing using the input second authentication information. Subsequently, the user brings his/her user terminal 300 close to an antenna for contactless communication of a local system 100, and causes the user terminal 300 to perform short-range wireless communication. In response to this, a result of the above-described second authentication processing is transmitted from the user terminal 300 to the local system 100. The local system 100 transmits, to a server 200, the input result of the second authentication processing. The server 200 updates authentication history information, based on a result of the received second authentication processing.

In the foregoing, example embodiments according to the present invention have been described with reference to the drawings, however, these are examples of the present invention, and various configurations other than the above can also be adopted.

Note that, in the present description, "acquisition" includes at least one of "acquisition of data stored in another apparatus or a storage medium by an own apparatus (active acquisition)", based on a user input, or based on a command of a program, for example, requesting or inquiring another apparatus and receiving, accessing to another apparatus or a storage medium and reading, and the like, "input of data to be output from another apparatus to an own apparatus (passive acquisition)", based on a user input, or based on a command of a program, for example, receiving data to be distributed (or transmitted, push-notified, or the like), and acquiring by selecting from received data or information, and "generating new data by editing data (such as converting into a text, rearranging data, extracting a part of pieces of data, and changing a file format) and the like, and acquiring the new data".

A part or all of the above-described example embodiments may also be described as the following supplementary notes, but is not limited to the following.

1. An authentication system to determine whether to allow entry into a second area, the second area being able to enter after passing a first area, the authentication system including, a determination unit that determines authentication information being used when a user enters the first area, and determines authentication information necessary for the user to enter the second area according to the determined authentication information.

2. The authentication system according to supplementary note 1, wherein, in a case where authentication information being used when a user enters the first area is determined to be authentication information of a first type, the determination unit determines that authentication information necessary for the user to enter the second area is authentication information of a second type being different from authentication information of the first type.

3. The authentication system according to supplementary note 1 or 2, wherein, in a case where authentication information being used when a user enters the first area is determined to be face information, the determination unit determines, as authentication information necessary for the user to enter the second area, user identification information being read by a reader.

4. The authentication system according to any of supplementary notes 1 to 3, wherein, in a case where authentication information being used when a user enters the first area is determined to be user identification information being read by a reader, the determination unit determines, as authentication information necessary for the user to enter the second area, user identification information being read by a reader, and face information.

5. The authentication system according to any of supplementary notes 1 to 4, wherein, in a case where authentication information being used when a user enters the first area is not determined to be face information, the determination unit determines, as authentication information necessary for the user to enter the second area, user identification information being read by a reader, and face information.

6. The authentication system according to any of supplementary notes 1 to 5, wherein, in a case where information that a user has entered the first area is not registered, the determination unit determines, as authentication information necessary for the user to enter the second area, user identification information being read by a reader, and face information.

7. The authentication system according to any of supplementary notes 1 to 6, further including a via-internet authentication unit that acquires face information from a user terminal via the Internet, performs authentication processing using the face information, and registers, in authentication history information, that authentication processing using the face information is successful, wherein, in a case where information that authentication processing by the user via the Internet is successful is registered in the authentication history information, the determination unit determines, as authentication information necessary to enter the second area, user identification information being read by a reader.

8. The authentication system according to supplementary note 7, wherein the via-internet authentication unit acquires position information of the user terminal, and in a case where a position indicated by the position information is present within a predetermined area, and authentication processing using the face information is successful, registers, in the authentication history information, that authentication processing using the face information is successful.

9. The authentication system according to any of supplementary notes 1 to 8, further including:

a storage unit that stores digital membership pass data and card identification information in association with each other; and a registration management unit that, after acquiring the card identification information and a first face image, collates between a second face image included in the digital membership pass data and the first face image, and stores, in the storage unit, the acquired card identification information and the digital membership pass data in association with each other, based on a collation result.

10. The authentication system according to supplementary note 9, wherein, in a case where the acquired card identification information and the digital membership pass data are stored in the storage unit in association with each other, the registration management unit transmits, to a terminal being associated with the digital membership pass data with which the acquired card identification information is associated, information for notifying that association is completed.

11. The authentication system according to supplementary note 9 or 10, wherein the registration management unit displays, on a screen after login with use of the digital membership pass data, a button for canceling association with the card identification information.

12. An authentication method including, by an authentication system to determine whether to allow entry into a second area, the second area being able to enter after passing a first area, determining authentication information being used when a user enters the first area, and determining authentication information necessary for the user to enter the second area according to the determined authentication information.

REFERENCE SIGNS LIST

1 Authentication information acquisition apparatus
2 Passage control apparatus
3 Authentication apparatus
4 Authentication history management apparatus
10 Authentication system
11 First authentication information acquisition unit
12 First authentication unit
13 Authentication history acquisition unit
14 Determination unit
15 Passage processing unit
16 Storage unit
17 Via-internet authentication unit
18 Second authentication information acquisition unit
19 Second authentication unit
20 Registration management unit
100 Local system
200 Server
300 User terminal
400 Communication network
1A Processor
2A Memory
3A Input/output I/F
4A Peripheral circuit
5A Bus

The invention claimed is:

1. An authentication system to determine whether to allow entry into a second area, the second area being able to be entered after passing a first area, the authentication system comprising:

at least one memory configured to store one or more instructions; and at least one processor configured to execute the one or more instructions to:

perform authentication processing via the Internet by:

acquiring biological information from a user terminal via the Internet, performing authentication processing using the acquired biological information, and registering, in authentication history information, that the authentication processing using the biological information acquired via the Internet is successful; and perform authentication processing at a plurality of authentication points by:

acquiring, as authentication information, user identification information or biological information, from authentication information acquisition apparatuses installed at the plurality of authentication points, performing authentication processing using the acquired authentication information, registering, in the authentication history information, that the authentication processing using the authentication information acquired by the authentication information acquisition apparatuses is successfully associated with a type of the acquired authentication information, and when authenticating a first user at a first authentication point among the plurality of authentication points, refer to the authentication history information of the first user, which includes registrations of the successful authentication processing via the Internet and the successful authentication processing at the plurality of authentication points, to identify a type of authentication information used in a past successful authentication, and determine, based on the identified type, authentication information required for authentication at the first authentication point.

2. The authentication system according to claim 1, wherein, the at least one processor is further configured to execute the one or more instructions to determine, in a case where authentication information being used when the user enters the first area is determined to be authentication information of a first type, that authentication information necessary for the user to enter the second area is authentication information of a second type being different from authentication information of the first type.

3. The authentication system according to claim 1, wherein, the at least one processor is further configured to execute the one or more instructions to, when determining authentication information to be used for the first user at a second authentication point to enter a second area, confirm a type of authentication information which has been used by the first user at the first authentication point to enter the first area by referring to the authentication history information, and in a case where authentication information which has been used by the first user at the first authentication point is biological information, determine, as authentication information to be used for the first user at the second authentication point, user identification information acquired by an authentication information acquisition apparatus installed at the second authentication point.

4. The authentication system according to claim 1, wherein, the at least one processor is further configured to execute the one or more instructions to, when determining authentication information to be used for the first user at a second authentication point to enter a second area, confirm a type of authentication information which has been used by the first user at the first authentication point to enter the first area by referring to the authentication history information, and in a case where authentication information which has been used by the first user at the first authentication point is user identification information being read by a reader and biological information, determine, as authentication information to be used for the first user at the second authentication point, user identification information and biological information acquired by the authentication information acquisition apparatus installed at the second authentication point.

5. The authentication system according to claim 1, wherein, the at least one processor is further configured to execute the one or more instructions to, when determining authentication information to be used for the first user at a second authentication point to enter a second area, confirm a type of authentication information which has been used by the first user at the first authentication point to enter the first area by referring to the authentication history information, and in a case where authentication information which has been used by the first user at the first authentication point is not biological information, determine, as authentication information to be used for the first user at the second authentication point, user identification information being read by a reader acquired by an authentication information acquisition apparatus installed at the second authentication point.

6. The authentication system according to claim 1, wherein, the at least one process is further configured to execute the one or more instructions to, when determining authentication information to be used for the first user at a second authentication point to enter a second area, confirm a type of authentication information which has been used by the first user at the first authentication point to enter the first area by referring to the authentication history information, and in a case where information which has been used by the first user at the first authentication point is not registered user identification information being read by a reader, determine, as authentication information to be used for the first user at the second authentication point, biological information acquired by an authentication information acquisition apparatus installed at the second authentication point.

7. The authentication system according to claim 1, wherein the at least one processor is further configured to execute the one or more instructions to:

when performing the authentication processing via the Internet, acquire position information of the user terminal, and in a case where a position indicated by the position information is present within a predetermined area, and the authentication processing using the biological information is successful, register, in the authentication history information, that the authentication processing using the biological information is successful.

8. An authentication method comprising:

determining, by an authentication system whether to allow entry into a second area, the second area being able to be entered after passing a first area;

performing authentication processing via the Internet by:

acquiring biological information from a user terminal via the Internet, performing authentication processing using the acquired biological information, and registering, in authentication history information, that the authentication processing using the biological information acquired via the Internet is successful; and perform authentication processing at a plurality of authentication points by:

acquiring, as authentication information, user identification information or biological information, from authentication information acquisition apparatuses installed at the plurality of authentication points, performing authentication processing using the acquired authentication information, and registering, in the authentication history information, that authentication processing using the authentication information acquired by the authentication information acquisition apparatuses is successfully associated with a type of the acquired authentication information, when authenticating a first user at a first authentication point among the plurality of authentication points, referring to the authentication history information of the first user, which includes registrations of the successful authentication processing via the Internet and the successful authentication processing at the plurality of authentication points, to identify a type of authentication information used in a past successful authentication, and determining, based on the identified type, authentication information required for authentication at the first authentication point.

* * * * *